(12) United States Patent
Pheng et al.

(10) Patent No.: US 12,214,969 B2
(45) Date of Patent: Feb. 4, 2025

(54) SPEED CONTROL SYSTEM FOR PERIPHERAL CONVEYORS OF SORTER SYSTEMS

(71) Applicant: INTELLIGRATED HEADQUARTERS, LLC, Mason, OH (US)

(72) Inventors: Sang Pheng, Cincinnati, OH (US); Daniel Siemer, Kings Mills, OH (US); Timothy Williams, Lebanon, OH (US); Lyle Webster, South Lebanon, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 224 days.

(21) Appl. No.: 18/065,793

(22) Filed: Dec. 14, 2022

(65) Prior Publication Data

US 2024/0199344 A1 Jun. 20, 2024

(51) Int. Cl.
*B65G 43/10* (2006.01)
*B65G 47/84* (2006.01)

(52) U.S. Cl.
CPC ........... *B65G 43/10* (2013.01); *B65G 47/844* (2013.01); *B65G 2203/0291* (2013.01); *B65G 2811/095* (2013.01)

(58) Field of Classification Search
CPC . B65G 43/10; B65G 47/844; B65G 2811/095

(Continued)

(56) References Cited

U.S. PATENT DOCUMENTS

| 6,240,335 B1 * | 5/2001 | Wehrung | G05B 19/4189 |
| | | | 198/577 |
| 6,264,042 B1 * | 7/2001 | Cossey, Jr. | B07C 5/362 |
| | | | 198/572 |

(Continued)

FOREIGN PATENT DOCUMENTS

| CA | 3168577 A1 | 9/2021 |
| WO | 2020/004917 A1 | 1/2020 |

OTHER PUBLICATIONS

Extended European Search Report Mailed on Apr. 16, 2024 for EP Application No. 23208135, 5 page(s).

(Continued)

*Primary Examiner* — Douglas A Hess
(74) *Attorney, Agent, or Firm* — Alston & Bird LLP

(57) ABSTRACT

A speed control system for sorters (e.g. sliding shoe sorters) comprises a sensor for measuring a sorter current speed of a sorter and a speed controller for setting peripheral conveyor commanded speeds for peripheral conveyors in communication with the sorter. During acceleration or deceleration of the sorter (e.g., in response to start or stop events of the sorter, or from one operating speed to another operating speed), the speed controller sets the peripheral conveyor commanded speeds to match or track the sorter current speed in order to ramp up or ramp down speeds of the peripheral conveyors with that of the sorter, which accelerates or decelerates more slowly than the peripheral conveyors. The speed controller may control the speed of different types of peripheral conveyors (e.g., upstream, intermediate, downstream) in various ways based on the type of the peripheral conveyors and/or based on user-configurable exception settings.

21 Claims, 11 Drawing Sheets

(58) Field of Classification Search
USPC .................................. 198/370.02, 575, 577
See application file for complete search history.

(56) References Cited

U.S. PATENT DOCUMENTS

| | | | | |
|---|---|---|---|---|
| 7,017,730 | B2* | 3/2006 | Mills ...................... | B65G 47/82 |
| | | | | 198/351 |
| 7,191,895 | B2* | 3/2007 | Zeitler ................... | B65G 43/08 |
| | | | | 198/572 |
| 8,060,245 | B2 | 11/2011 | Lupton et al. | |
| 8,201,681 | B2* | 6/2012 | Schiesser ............. | B65G 47/844 |
| | | | | 198/460.1 |
| 8,504,195 | B2* | 8/2013 | Dehne ................... | B61B 13/127 |
| | | | | 700/229 |
| 9,022,203 | B2* | 5/2015 | LaPierre ................ | B65G 37/00 |
| | | | | 198/623 |
| 9,409,716 | B2* | 8/2016 | Bastian, II ............. | B65G 43/08 |
| 9,422,119 | B1* | 8/2016 | Fortenbery ............ | B65G 47/38 |
| 10,106,330 | B2* | 10/2018 | Maines .................... | B07C 5/36 |
| 10,532,894 | B2* | 1/2020 | Kuhn ..................... | B65G 13/10 |
| 10,981,731 | B2* | 4/2021 | Prutu ..................... | B65G 43/10 |
| 11,407,596 | B1* | 8/2022 | Nitzberg .............. | B65G 47/268 |

OTHER PUBLICATIONS

Material Handling 24/7, "Dematic Automatic Speed Control for conveyors and sorters", retrieved from the Internet at <URL: https://www.materialhandling247.com/product/automatic_speed_control_for_conveyors_and_sorters/conveyors> on Feb. 7, 2023, 5 pages.

* cited by examiner

| CONVEYOR GROUP | SUPPORTED EXCEPTION TYPES | DEFAULT ACTIONS | ALLOWED OVERRIDE ACTIONS |
|---|---|---|---|
| UPSTREAM | NOT SUPPORTED | NOT SUPPORTED | NOT SUPPORTED |
| INTERMEDIATE | RECIRC FULL | RAMP TO STOP | STOP<br>RAMP TO STOP |
| | EXIT JAM | RAMP TO STOP | |
| | SAFETY FAULT | RAMP TO STOP | |
| | E-STOP | STOP | |
| | ENTRANCE JAM | STOP | |
| DOWNSTREAM | RECIRC FULL | RAMP TO STOP | STOP<br>IDLE<br>RAMP TO STOP<br>RAMP TO IDLE<br>NONE |
| | EXIT JAM | RAMP TO IDLE | |
| | SAFETY FAULT | RAMP TO IDLE | |
| | E-STOP | STOP | |
| | ENTRANCE JAM | RAMP TO IDLE | |

FIG. 10

SPEED CONTROL SYSTEM FOR PERIPHERAL CONVEYORS OF SORTER SYSTEMS

TECHNICAL FIELD

Example embodiments of the present invention relate generally to a material handling system for handling articles, and, more particularly, to a sorter system and speed control for sorters and peripheral conveyors of the sorter system.

BACKGROUND

Applicant has identified many technical challenges and difficulties associated with current solutions for conveyors and, specifically, sortation conveyors. Through applied effort, ingenuity, and innovation, Applicant has solved problems relating to sortation conveyors by developing solutions embodied in the present disclosure, which are described in detail below.

BRIEF SUMMARY

According to one aspect, embodiments of the present invention feature a speed control system for sorters. The speed control system comprises a sensor and a speed controller. The sensor measures a sorter current speed for a sorter. The speed controller sets peripheral conveyor commanded speeds for peripheral conveyors, which are in communication with the sorter. The peripheral conveyor commanded speeds are set such that a peripheral conveyor commanded speed is set based at least in part on the sorter current speed during acceleration or deceleration of the sorter.

In some embodiments, the speed controller sets the peripheral conveyor commanded speed based at least in part on the sorter current speed by setting the peripheral conveyor commanded speed to match the sorter current speed or track the sorter current speed during acceleration or deceleration of the sorter.

In some embodiments, the acceleration or deceleration of the sorter is from an initial sorter operating speed corresponding to a first normal operating condition of the sorter to a subsequent sorter operating speed corresponding to a second normal operating condition of the sorter.

In some embodiments, in response to detecting start events at the sorter, the speed controller continuously determines the sorter current speed during acceleration of the sorter to a predetermined sorter operating speed, and sets each peripheral conveyor commanded speed to a predetermined peripheral conveyor operating speed for the peripheral conveyor in response to determining that the sorter current speed has reached the predetermined peripheral conveyor operating speed. During the acceleration of the sorter, the speed controller continuously updates each peripheral conveyor commanded speed based at least in part on the sorter current speed in response to determining that the sorter current speed does not exceed the predetermined peripheral conveyor operating speed for the peripheral conveyor. Here, the speed controller might set downstream conveyor commanded speeds for downstream conveyors of the peripheral conveyors to a predetermined idle speed in response to the detection of the start events and update the downstream conveyor commanded speeds based at least in part on the sorter current speed only in response to determining that the sorter current speed meets or exceeds the predetermined idle speed. In another example, the speed controller might update upstream conveyor commanded speeds for upstream conveyors of the peripheral conveyors based at least in part on the sorter current speed only in response to determining that the sorter current speed meets or exceeds a predetermined feeding speed.

In some embodiments, in response to detecting stop events at the sorter, the speed controller stops upstream conveyors of the peripheral conveyors and, during deceleration of the sorter to a stopped state, the speed controller continuously determines the sorter current speed and updates downstream conveyor commanded speeds for downstream conveyors of the peripheral conveyors based at least in part on the sorter current speed. Here, the speed controller might set the downstream conveyor commanded speeds to a predetermined idle speed in response to determining that a detected stop event was not operator-initiated and that the sorter current speed is less than the predetermined idle speed.

In some examples, during deceleration of the sorter to a stopped state, in response to detecting stop events at the sorter, the speed controller might set the peripheral conveyor commanded speeds based at least in part on the sorter current speed or set the peripheral conveyor to immediately decelerate to a stopped state or to a predetermined idle speed based on user-configurable exception settings stored by the speed controller.

According to another aspect, embodiments of the present invention feature a speed control method for sorters. A current speed of a sorter is measured. Peripheral conveyor commanded speeds for peripheral conveyors in communication with the sorter are set such that a peripheral conveyor commanded speed is set based at least in part on the sorter current speed during acceleration or deceleration of the sorter.

According to another aspect, embodiments of the present invention feature a sorter system comprising a sensor and a speed controller. The sensor measures a sorter current speed for a sorter of the sorter system. The speed controller sets peripheral conveyor commanded speeds for peripheral conveyors of the sorter system, which are in communication with the sorter. The peripheral conveyor commanded speeds are set such that a peripheral conveyor commanded speed is set based at least in part on the sorter current speed during acceleration or deceleration of the sorter.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

The following drawings are illustrations of a particular embodiments of the present disclosure and thereof do not limit the scope or spirit of the present disclosure. The drawings are not necessarily drawn to scale, nor are they necessarily are intended for use in conjunction with the explanation in the following detailed description.

FIG. 10 is a table illustrating exemplary exception settings for determining different behavior of different types of peripheral conveyors in response to certain situations.

DETAILED DESCRIPTION

Figure 1:
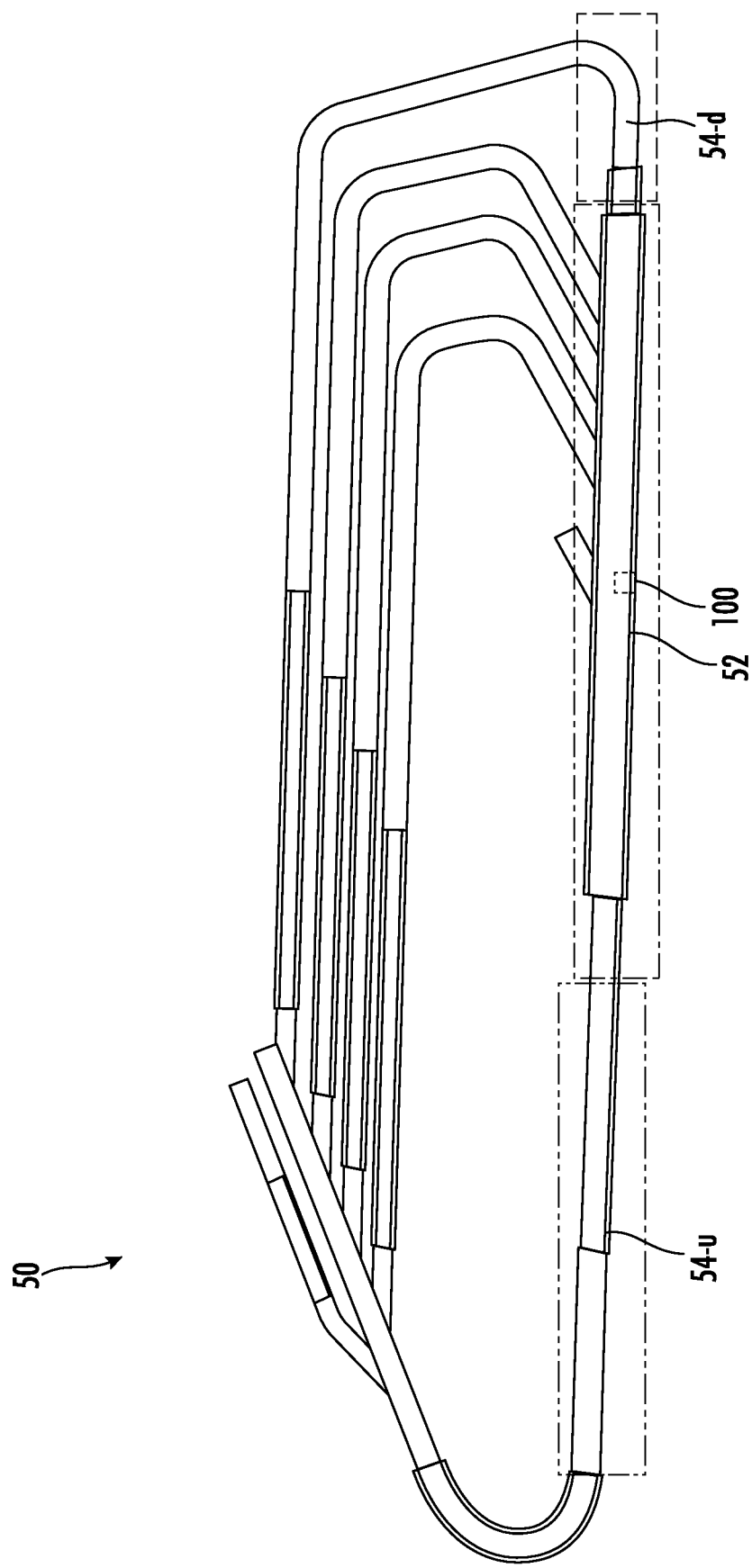
FIG. 1 is an illustration of an exemplary sorter system to which the present disclosure is applicable.

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. Terms such as "example", "illustrative", and "exemplary" are used to refer to examples with no indication of quality level or preference. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment). The present disclosure intends to include specific reference to all combinations and subcombinations of physically compatible features, components, apparatuses, and processes described herein. As used herein, the term "or" is used in both the alternative and conjunctive sense, unless otherwise indicated. Use of any such aforementioned terms, or similarly interchangeable terms, should not be taken to limit the spirit and scope of embodiments of the present invention. As used in the specification and the appended claims. The singular form of "a," "an," and "the" include plural references unless otherwise stated. The terms "includes" and/or "including," when used in the specification, specify the presence of stated features, elements, and/or components, and/or groups thereof.

If the specification states a component, feature, or structure "can," "may," "could," "should," "would," "preferably," "possibly," "typically," "optionally," "for example," "often," or "might," or other such language, be included or have a characteristic, that component, feature, or structure is not required to be included or to have the characteristic. Such component, feature, or structure may be optionally included in some embodiments, or it may be excluded.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

A software component may be coded in any of a variety of programming languages. An illustrative programming language may be a lower-level programming language such as an assembly language associated with a particular hardware architecture and/or operating system platform/system. Other example of programming languages included, but are not limited to, a macro language, a shell or command language, a job control language, a script language, a database query, or search language, and/or report writing language. In one or more example embodiments, a software component comprising instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or library. Software components may be static (e.g., pre-established, or fixed) or dynamic (e.g., created or modified at the time of execution).

The figures of the disclosure are not necessarily drawn to scale and are provided to illustrate some examples of the invention described. The figures are not to limit the scope of the depicted embodiments or the appended claims. Aspects of the disclosure are described herein with reference to the invention to example embodiments for illustration. It should be understood that specific details, relationships, and method are set forth to provide a full understanding of the example embodiments. One of ordinary skill in the art recognize the example embodiments can be practiced without one or more specific details and/or with other methods.

In example material handling environments, multiple conveyors can be arranged for transporting articles from one place to another. These articles may be consumer goods, packaged boxes, cases, items, cartons, and/or the like that are to be transported on such conveyors from a source location to a destination location. In a typical configuration, conveyors used for transporting articles generally include a pick area, transport conveyors, a merge subsystem, and a sorter system that sorts articles and directs the sorted articles to their intended destination.

In some examples, conveyors have a carrying element (such as a belt or roller) upon which the articles are directed. The carrying element is driven by a motor, which causes the carrying element to transport the articles along an extent of the conveyor and deposit the articles at a point situated beyond the extent of the conveyor (e.g., onto a subsequent conveyor, into a sorter, into a receptacle).

Sorters are, in some examples, conveyor-based as they include a sortation conveyor for transporting the articles through the sorter during the sortation process, induct conveyors that induct or feed the articles onto the sortation conveyor, sorting elements for directing the articles based on preconfigured sorting criteria, various receptacles (e.g., lanes, conveyors, bins, etc.) for receiving the sorted articles, and/or recirculation conveyors for recirculating articles that did not get diverted to one of the receptacles back to the induct conveyors.

One type of sorter is the sliding shoe sorter. The carrying element of the sortation conveyor of the sliding shoe sorter is a series of slats, upon which the articles are directed and which transport the articles. Divert shoes move across (e.g., orthogonally with respect to movement of the slats and/or articles) the sortation conveyor to push the articles into or onto the appropriate receptacles. Generally, the slats are arranged in a series along a longitudinal extent of the sortation conveyor and connected by a drive chain, forming narrow lanes between each pair of slats, along which the divert shoes are configured to move. The sliding shoe sorter often, in some examples, comprises a reader for optically reading identification information (e.g., indicated by barcodes or other optical codes). A controller directs the movement of the divert shoes based on the identification information of an article read by the reader and positions of the various divert shoes with respect to the article and with respect to the different receptacles.

In some example sliding shoe sorters, the sorter (e.g., specifically the sortation conveyor of the sorter) tends to accelerate from rest and decelerate to a stop significantly more slowly relative to peripheral conveyors of the sorter (e.g., conveyors connected to the sorter upstream or downstream of the sorter with respect to the direction of motion of the sorter). This is due, in some examples, to the carrying element(s) of the sliding shoe sorter (e.g., slats and chains) having more mass relative to the carrying element(s) of the peripheral conveyors (e.g., belts or rollers). For example, when a sorter is running at full speed and is requested to stop, its momentum causes a slow deceleration of the sorter relative to that of the peripheral conveyors. In another example, when the sorter is stopped and is requested to start, inertia causes a relatively slow acceleration of the sorter. Because belt and roller conveyors can start and stop much faster than the sortation conveyor of the sliding shoe sorter, there is typically a speed differential between the conveyors and the shoe sorter during acceleration and deceleration.

A mismatch of speed between a sorter and peripheral conveyors can cause a number of problems, in some examples. The mismatch can cause articles (e.g., cartons) to flip over or collide with one another. For example, during acceleration, an upstream conveyor reaches its operating speed more quickly than the sorter, and when articles carried by the upstream conveyor flow onto the more slowly moving sorter, those articles may collide with each other. Likewise, during acceleration, a downstream conveyor reaches its operating speed more quickly than the sorter, and when articles carried by the sorter flow onto the more quickly moving downstream conveyor, those articles may get flipped over. In another example, during deceleration, when the sorter is stopping from operating speed, the downstream conveyor stops much more quickly than the sorter, and any articles carried by the sorter onto the slower moving (or stopped) downstream conveyor may collide with each other or flip. These collisions and flipped articles result in lower sortation efficiency, because sortation requires a gap between articles and typically requires barcode labels (e.g., read by the reader of the sorter) to be on the top side of the article.

According to various embodiments, the presently disclosed speed control system for sorter systems solves, in some examples, one or more problems, such as the problems discussed above, by controlling the speed of peripheral conveyors based on a sorter current speed for the sorter (e.g., current speed of the sortation conveyor of the sorter). In particular, a speed controller controls the ramp-up and ramp-down speeds (e.g., speeds during acceleration and deceleration, respectively) of the upstream and downstream conveyors based on a shoe sorter state (such as accelerating, decelerating, stopped, running) and the sorter's calculated speed. To that end, the speed control system comprises a sensor for determining the sorter current speed. For example, the sensor may be a shoe bearing sensor that calculates the sorter current speed based on detected intervals of the moving shoes of the sorter. In one embodiment, the speed controller comprises a state machine that controls the ramp-up and ramp-down speeds of the upstream and downstream conveyors based on the shoe sorter state (i.e. accelerating, decelerating, stopped, running) and the sorter's calculated speed.

In one example, when a start command is received by the sorter and/or speed control system, the speed controller first sets the downstream conveyor(s) to run at a configurable idle speed, which is a speed that is much slower than a normal operating speed of the downstream conveyors. When it is determined that the downstream conveyor is running, the sorter begins accelerating. At this point, any articles being transferred from the sorter onto the downstream conveyor would only experience a small speed differential, which would reduce the likelihood of carton flipping, as the sorter tends to accelerate slowly, and the downstream conveyor(s) is set to the relatively low idle speed. The speed controller then continuously determines the sorter current speed, and, once the sorter accelerates past the idle speed, the speed controller sets the downstream conveyor(s) to match the sorter current speed during acceleration of the sorter. As a result, the speed differential is now at or close to zero, and articles can transfer from the sorter onto the downstream conveyor(s) smoothly. Meanwhile, at the sorter's upstream, when the sorter current speed reaches a predetermined feeding speed (e.g., a speed at which the sorter is ready to receive articles), the speed controller ramps up the upstream conveyor(s) speed to match the sorter current speed. As a result, the speed differential between the upstream conveyor(s) and the sorter is at or close to zero, which allows cartons to flow smoothly onto the sorter. During stopping, the speed controller again commands the downstream conveyor(s) to match the sorter current speed during deceleration, which in turn, allows articles to flow smoothly from the sorter to the downstream conveyor(s). Exception settings (e.g., input by a user) can cause the peripheral conveyors to not ramp down during the sorter deceleration, for example, in the case of an emergency stop or other configurable events.

By reducing the speed differentials between the sorter and the peripheral conveyors during sorter acceleration and deceleration, the presently disclosed speed control system, in some examples, prevents and/or reduces collision and flipping of articles, increasing sortation efficiency.

In general, the present disclosure concerns sorter systems 50.

FIG. 1 is an illustration of an exemplary sorter system 50 to which the present disclosure is applicable. In general, the sorter system 50 may comprise a sorter 52 configured to sort articles and to direct the sorted articles to their intended destinations. The articles may be consumer goods, packaged boxes, cases, items, cartons, and/or the like that are to be transported from a source location to a destination location.

The sorter 52 may be conveyor-based, having a sortation conveyor for transporting the articles through the sorter 52 during the sortation process. Accordingly, the sorter system 50 may comprise peripheral conveyors 54 for the sorter 52, which are in communication with the sorter 52. For example, the peripheral conveyors 54 may be configured to direct articles (e.g., to be sorted) toward the sorter 52 and/or onto the sortation conveyor of the sorter 52 and/or receive articles (e.g., that have been sorted or that were not sorted and need to be fed back into the sorter) from the sortation conveyor of the sorter 52 and/or away from the sorter 52.

In general and in some examples, conveyors, including the peripheral conveyors 54 and/or the sortation conveyor of the sorter 52, may have a carrying element (such as a belt, roller, or slats) upon which the articles are directed. The carrying element may be driven by a motor, which may cause the carrying element to transport the articles along an extent of the conveyor and deposit the articles at a point situated beyond the extent of the conveyor (e.g., onto a subsequent conveyor, into a sorter 52, into a receptacle).

The peripheral conveyors 54 may include one or more upstream conveyors 54-*u*, which are generally in communication with the sorter 52 and connected to the sorter 52 at any point upstream of the sorter 52 in the sorter system 50 such that the upstream conveyors 54-*u* transport the articles toward the sorter 52 and/or onto the sortation conveyor of the sorter 52. The upstream conveyors 54-*u* for a given sorter 52 may include an induct conveyor that is adjacent to the sorter 52 and is configured to induct or feed the articles directly onto the sortation conveyor of the sorter 52. The upstream conveyors 54-*u* for a given sorter 52 may also include one or more conveyors that are not directly adjacent to the sorter 52 but are in communication with the sorter 52, connected to the sorter 52 at a point further upstream of the sorter 52 than the induct conveyor, and are configured to transport the articles toward the sorter 52 and onto subsequent upstream conveyors 54-*u* that transport the articles, ultimately, onto the induct conveyor and onto the sortation conveyor of the sorter 52.

The peripheral conveyors 54 may comprise one or more downstream conveyors 54-*d*, which are generally connected to the sorter 52 at any point downstream of the sorter 52 in the sorter system 50, such that the downstream conveyors 54-*d* receive the articles from the sortation conveyor of the sorter 52 and/or transport the articles away from the sorter 52. The downstream conveyors 54-*d* for a given sorter 52 may include one or more recirculation conveyors, at least one of which is adjacent to the sorter 52 (e.g., on the opposite end of the sorter 52 as the induct conveyor) and is configured to receive the articles directly from the sortation conveyor of the sorter 52 and transport the articles back onto the sorter 52 (e.g., by transporting the articles back onto one of the upstream conveyors 54-*u*). The downstream conveyors 54-*d* for a given sorter may also include one or more receptacle conveyors, at least some of which are adjacent to the sorter 52 at the various receptacles of the sorter 52, each of which is associated with a destination location for the articles and configured to receive the sorted articles from the sorter and transport the sorted articles toward the associated destination location.

The peripheral conveyors 54 may also include one or more intermediate conveyors (not illustrated), which connect two sorters 52 of a sorter system 50, receiving articles from the sortation conveyor of a first sorter 52, transporting the received articles toward a second sorter 52, and feeding the transported articles onto the sortation conveyor of the second sorter 52.

In general, the present disclosure concerns speed control of sorters 52 and peripheral conveyors 54 of sorter systems 50. For the sake of clarity, a speed of a sorter 52 may describe generally a speed at which a sortation conveyor of the sorter 52 operates (e.g., transports articles through the sorter 52). Likewise, acceleration and deceleration of a sorter 52 may describe increase and decrease, respectively, of the sorter speed for a period of time (e.g., from a stop to an operating speed, from operating speed to a stop). Similarly, a speed of a peripheral conveyor may describe generally a speed at which the peripheral conveyor 54 operates (e.g., transports the articles along its extent), and acceleration and deceleration of a peripheral conveyor 54 may describe an increase and decrease, respectively, of the peripheral conveyor speed. The speed and acceleration may be understood to encompass values expressed with respect to any units and/or with respect to any components and/or characteristics of the respective conveyors and/or movement of the components/conveyors (e.g., distance traveled by article per unit of time, distance traveled by carrying elements per unit of time, rotations of carrying elements, pulleys, drive chains, or other drive elements per unit of time).

Accordingly, in the illustrated example, the sorter system 50 comprises a sorter 52 connected to and in communication with peripheral conveyors 54 for the sorter 52 (including upstream conveyors 54-*u* and downstream conveyors 54-*d*), and a speed control system 100.

In general, the speed control system 100 may be configured to control speeds of the sorter 52 and peripheral conveyors 54 and/or coordinate the speeds (e.g., by minimizing differentials between the speeds with respect to each other).

Figure 2A:
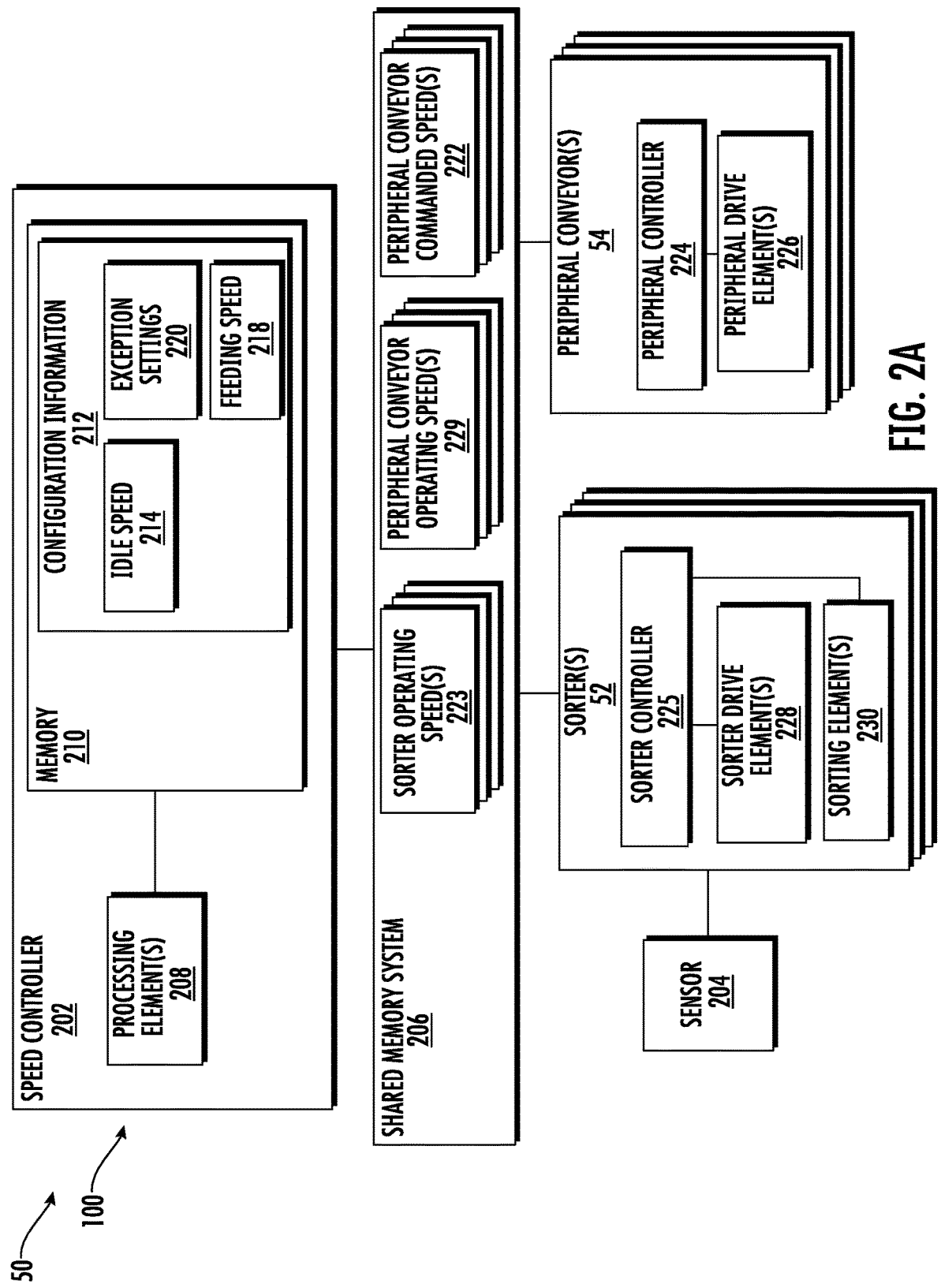
FIG. 2A is a schematic diagram of an exemplary speed control system according to various embodiments.

FIG. 2A is a schematic diagram of an exemplary speed control system 100 according to various embodiments, showing components of the speed control system 100, sorter 52, and peripheral conveyors 54 in additional detail.

In the illustrated example, the speed control system 100 comprises a speed controller 202 and a sensor 204. The speed controller 202 is connected to one or more sorters 52 and one or more peripheral conveyors 54 (in communication with the one or more sorters 52) and comprises processing elements 208 and memory 210, which stores configuration information 212, including an idle speed 214, a feeding speed 218, and exception settings 220. The sorter 52 comprises a sorter controller 225, sorter drive elements 228, and sorting elements 230. The peripheral conveyors 54 comprise a peripheral controller 224 and peripheral drive elements 226. Here, each of the peripheral conveyors 54 may be understood to be connected to and/or in communication with at least one of the one or more sorters 52 (e.g., as previously described).

In general, the speed controller 202 may direct functionality of the speed control system 100, for example, by executing (e.g., via the processing element 208) firmware and/or software instructions, which may be stored in the memory 210. Likewise, the sorter controller 225 and the peripheral controller 224 may direct functionality of the sorter 52 and peripheral conveyor 54, respectively, for example, by executing (e.g., via processing elements) firmware and/or software instructions, which may be stored in memory of the respective devices. In various embodiments, any of the speed controller 202, the sorter controller 225, and/or the peripheral controller 224 may be implemented as a programmable logic controller (PLC), a state machine, a small single-board computer, a microcontroller unit, or a system on a chip (SoC), including one or more processor cores along with memory and programmable input/output peripherals such as analog to digital converts and digital to analog converters. In various embodiments, the speed controller 202 may be integrated into the sorter 52, and the processing elements 208 of the speed controller 202 may be configured to direct the functionality and/or execute firmware and/or software instructions for implementing both the speed controller 202 and the sorter controller 225.

The processing element(s) 208 of the speed controller 202 and/or processing elements of the sorter controller 225 and peripheral controller 224 (not illustrated), may represent one or more general-purpose processing devices such as a processor, microprocessor, central processing unit, or the like or may be implemented as a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. The processing element(s) 208 of the speed controller 202 and/or processing elements of the sorter controller 225 and peripheral controller 224 (not illustrated) may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing element(s) 208 of the speed controller 202 and/or processing elements of the sorter controller 225 and peripheral controller 224 (not illustrated) may be configured to execute processing logic in instructions (e.g., stored in the memory 210 or in the processing element(s) themselves, or provided via a computer readable medium) for performing the operations and steps discussed herein.

The memory 210 of the speed controller 202, memory of the sorter controller 225 and peripheral controller 224 (not illustrated), and/or the shared memory system 206 may comprise any combination of main memory and/or static memory, including read-only memory (ROM), flash memory, dynamic random access memory (DRAM) such as synchronous DRAM (SDRAM), static random access memory (SRAM), and the main memory and/or static memory may be any type of memory or may be used to implement any type of memory systems.

The processing element(s) 208 and the memory 210 of the speed controller 202 may communicate with each other via a data bus. The processing element(s) 208 may be connected to the memory 210 directly or via some other connectivity means. Likewise, any of the processing element(s) 208 of the speed controller 202 or those of the sorter controller 225 and/or the peripheral controller 224 may communicate with the shared memory system 206 via a data bus, may be connected to the shared memory system 206 directly, and/or may be connected to the shared memory system 206 via some other connectivity means.

In general, the shared memory system 206 may be memory that is accessible by the speed controller 202, sorter controller 225, and peripheral controller 225. The shared memory system 206 may be implemented as a centralized memory or a distributed shared memory system sharing a common address space distributed across physically separated memories of the respective controllers 202, 225, 224.

The various illustrative logical blocks, steps, operations, algorithms, described in connection with the embodiments disclosed herein may be implemented or performed with the processing element 208 of the speed controller 208, for example. The embodiments disclosed herein include various steps (to be described). The steps of the embodiments disclosed herein may be performed by hardware components or may be embodied in machine-executable instructions, which may be used to cause a general-purpose or special-purpose processing device, such as the processing element(s) of the speed controller 202, programmed with the instructions to perform the steps. Alternatively, the steps may be performed by a combination of hardware and software.

Those of skill in the art would further appreciate that the various illustrative logical blocks, steps, operations, and/or algorithms described in connection with the embodiments disclosed herein may be implemented as electronic hardware, instructions stored in memory (e.g., the memory 210 of the speed controller 202) or in another computer-readable medium and executed by the processing element(s) 208 of the speed controller 202. Memory disclosed herein may be any type and size of memory and may be configured to store any type of information desired. To clearly illustrate this interchangeability, various illustrative components, blocks, modules, circuits, and steps have been or will be described generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present embodiments.

Generally, the peripheral controller 224 of the peripheral conveyor 54 may direct the functionality of the peripheral conveyor 54 by controlling (e.g., sending instructions to and/or receiving information from) the peripheral drive element(s) 226. The peripheral drive elements 226 may comprise a motor and a carrying element (e.g., belts, rollers) of the peripheral conveyor 54. The articles may be directed onto the carrying element, and the motor may drive the carrying element in response to instructions and/or signals from the peripheral controller 224, which may cause the carrying element to transport the articles along an extent of the conveyor and deposit the articles at a point situated beyond the extent of the conveyor (e.g., onto a subsequent conveyor, into the sorter 52).

The sorter controller 225 of the sorter 52 may direct the functionality of the sorter 52 by controlling (e.g., sending instructions to and/or receiving information from) the sorter drive element(s) 228 and the sorting element(s) 230. The sorter drive elements 228 may comprise a motor and a carrying element (e.g., slats) of a sortation conveyor of the sorter 52. The articles may be directed onto the carrying element, and the motor may drive the carrying element in response to instructions and/or signals from the sorter controller 225, which may cause the carrying element to transport the articles through the sorter.

Additionally, the sorting elements 230 of the sorter 52 may comprise a reader (e.g., optical reader for reading optical codes such as barcodes) and one or more actuators for directing an article on the sortation conveyor toward, into, and/or onto a receptacle corresponding to the destination location intended for the article in response to instructions and/or signals from the sorter controller 225.

The sorter 52 may take the form of a sliding shoe sorter in some example embodiments. In such examples, the carrying element of the sorter drive elements 228 may be a series of slats, upon which the articles are directed and which transport the articles. The actuators of the sorting elements 230 may comprise one or more divert actuators, each positioned just upstream of a divert lane, which move across (e.g., orthogonally with respect to movement of the slats and/or articles) the sortation conveyor to push the articles into or onto the appropriate receptacles via the divert lane. The divert actuator directs the divert shoes to either travel straight (e.g., unactuated) or divert (e.g., actuated). The slats may be arranged in a series along a longitudinal extent of the sortation conveyor and connected by a drive chain, forming narrow lanes between each pair of slats, along which the divert shoes are configured to move. The reader of the sorting elements 230 may be configured to optically read identification information (e.g., indicated by barcodes or other optical codes) from articles as they are transported through the sorter 52. The sorter controller 225 may be configured to direct the movement of the divert shoes based on the identification information of an article read by the reader and positions of the various divert shoes with respect to the article and with respect to the different receptacles.

The speed controller 202 may be configured to set commanded speeds of the peripheral conveyor 54. Generally, a commanded speed may be understood as describing a speed at which a peripheral conveyor 54 is set (e.g., commanded, instructed, programmed) to operate at a given instance of time (e.g., a current instance in time), and setting a commanded speed of a conveyor causes the conveyor to operate at that speed (e.g., after accelerating or decelerating from an initial speed, corresponding to a previous commanded speed, to a current commanded speed). A current speed of a conveyor may be understood as describing a speed at which a sorter 52 or a peripheral conveyor 54 is actually operating at a current instance of time (e.g., determined via detection, measurement, and/or calculation). Typically, the commanded speed and the current speed of peripheral conveyors 54 would not significantly differ with respect to each other at any given instance of time, because the peripheral conveyors 54, having a sufficiently low mass (e.g., of carrying elements of the peripheral conveyors 54), are able to accelerate and decelerate from a given initial speed to the commanded speed without significant delay, at least with respect to the acceleration and deceleration of the sorter 52.

The speed controller 202 may be configured to set the commanded speeds of the peripheral conveyor 54 based on the configuration information 212 stored in the memory 210 and/or information stored in the shared memory system 206. More particularly, the speed controller 202 may be configured to set the commanded speeds to the stored idle speed 214 or to respective peripheral conveyor operating speeds 229. Moreover, the speed controller 202 may be configured to determine and/or set the commanded speeds based on a comparison of a current speed (e.g., of the sorter 52) to the idle speed 214, the feeding speed 218, or to the peripheral conveyor operating speed 229. Any of the idle speed 214, the feeding speed 218, and/or the peripheral conveyor operating speed 229 may be configurable by a user (e.g., via input received by the speed controller 202 via a user interface or via configuration files which are processed as part of the speed controller's 202 startup routine).

The sorter current speed may refer to the current speed of the sorter 52 (e.g., measured by the sensor 204 and/or received by the speed controller 202 via the sorter controller 225). The sensor 204 may be a shoe bearing sensor that determines and/or calculates the sorter current speed based on detected intervals of the moving divert shoes of the sorter. The sensor 204 may be connected to the sorter 52, the sorter controller 225 may compute the sorter current speed, and the speed controller 202 may receive the sorter current speed from the sorter controller 225 (e.g., via the shared memory system 206 or via other communication mechanisms).

The peripheral conveyor commanded speed 222 may generally be a value corresponding to the commanded speed for the peripheral conveyors 54.

The idle speed 214 may be a predetermined value corresponding to a speed at which peripheral conveyors 54 (e.g., downstream conveyors 54-*d*) should operate during an idle period (e.g., when not receiving articles from and/or transporting articles away from the sorter 52, when the sorter is empty, when the sorter 52 is first started, when the sorter 52 has been stopped). In one example, the idle speed 214 may be in a range of 24 feet per minute (fpm) to 200 fpm, or preferably from 50 fpm to 100 fpm.

In general, an operating speed may be a predetermined value corresponding to a speed at which the sorter 52 and/or the peripheral conveyors 54 should operate during a normal operation condition (e.g., while the articles are actively transported onto the sorter 52 and/or sorted). Each sorter 52 and peripheral conveyor 54 may have one or more operating speeds specific to that sorter 52 or peripheral conveyor 54, each of the one or more operating speeds for a given conveyor being associated with a different operating mode, for example. Accordingly, each sorter 52 and peripheral conveyor 54 may run at a different speed with respect to other conveyors. The peripheral conveyor operating speeds 229 for each peripheral conveyor may be stored in the shared memory system 206. In one example, any of the sorter operating speeds 223 and/or the peripheral conveyor operating speeds 229 may be in a range of 150 fpm to 1300 fpm, or preferably from 300 fpm to 650 fpm.

The feeding speed 218 may be a predetermined value corresponding to a speed at which the sorter 52 is able to receive articles from the peripheral conveyors 54 (e.g., the upstream conveyors 54-*u*). For the purposes of illustration, the feeding speed 218 is depicted as part of the configuration information 212 stored in the memory 210 of the speed controller 202. However, in various embodiments, the feeding speed 218 may be set, owned, maintained, and/or stored by the sorter 52 and communicated to the speed controller 202, which may store a copy of the feeding speed 218 in the configuration information 212 of the memory 210. In various embodiments (not illustrated), the feeding speed 218 may be stored in the shared memory system 206 and accessible to the speed controller 202 but otherwise set, owned, maintained, and/or stored by the sorter 52. In one example, the feeding speed 218 may be in a range of 25 fpm to 300 fpm, or preferably from 50 fpm to 150 fpm.

The sorter controller 225 may be configured to send instructions and/or signals to the sorter drive elements 228 (e.g., motor) causing the sorter 52 to operate at a selected sorter operating speed 223 (e.g., out of one or more sorter operating speeds 223 for each sorter 52), which may be stored in memory accessible by the sorter controller 225 such as the shared memory system 206.

The peripheral controller 224 may be configured to receive the peripheral conveyor commanded speed 222 (e.g., from the speed controller 202) and send instructions and/or signals to the peripheral drive elements 226 (e.g., motor) causing the peripheral conveyor 54 to operate at the received peripheral conveyor commanded speed 222.

The received peripheral conveyor commanded speed 222 for the peripheral conveyor 54 may be an updated commanded speed (e.g., received from the speed controller 202), and the peripheral controller 224 may be configured to, in response to receiving an updated target speed, send instructions and/or signals to the peripheral drive elements 226 (e.g., motors) causing the peripheral conveyor 54 to operate at the received updated commanded speed (e.g., by accelerating or decelerating from an initial speed to the updated commanded speed).

The peripheral conveyor commanded speed 222 may be stored by the shared memory system 206. Accordingly, the peripheral controller 224 may be configured to receive the peripheral conveyor commanded speed 222 (e.g., from the speed controller 202) by retrieving the peripheral conveyor commanded speed 222 stored in the shared memory system 206. The speed controller 202 may be configured to set the peripheral conveyor commanded speed 222 by storing the peripheral conveyor commanded speed 222 in the shared memory system 206. Additionally, the speed controller 202 may be configured to update the peripheral conveyor commanded speeds 222 by updating the peripheral conveyor commanded speed 222 already stored in the shared memory system 206 (e.g., overwriting a previous commanded speed value with a newly set commanded speed value, adding a commanded speed value corresponding to a current instance of time to a stored series of values). Here, the peripheral controller 224 may be configured to monitor for changes to the stored peripheral conveyor commanded speed 222, retrieve the updated peripheral conveyor commanded speed 222 in response to detecting changes to the stored peripheral conveyor commanded speed 222, and send instructions and/or signals to the peripheral drive elements 226 (e.g., motor) causing the peripheral conveyor 54 to operate at the retrieved updated peripheral conveyor commanded speed 222. In another example, the peripheral controller 224 may be configured to retrieve the stored peripheral conveyor commanded speed 222 at periodic intervals.

The peripheral drive elements 226 of a peripheral conveyor 54 may comprise a variable frequency drive (VFD), which may be a motor drive configured to vary motor speed and/or torque (e.g., of the motor of the peripheral drive elements 226) based on varying motor input frequency. In various embodiments, the VFD may vary the motor input frequency based on the peripheral conveyor commanded speed 222, in conjunction with the peripheral controller 224 (e.g., in response to instructions and/or signals from the peripheral controller 224 indicative of the peripheral conveyor commanded speed 222), causing the peripheral conveyor 54 to operate at a speed corresponding to the peripheral conveyor commanded speed 222.

The speed controller 202 may be configured to stop the peripheral conveyors 54 (e.g., by sending stop/deactivation instructions and/or signals, by setting the peripheral conveyor commanded speed 222 to a predetermined stopped speed, which may represent a value of 0). In response to the speed controller 202 stopping the peripheral conveyors 54, the stopped peripheral conveyors 54 decelerate from an initial speed to a stop and assume a stopped state, during which the stopped peripheral conveyors 54 do not transport articles (e.g., carrying elements of the stopped conveyors being still and without movement).

The speed controller 202 may be configured to, via the sensor 204 and/or the sorter controller 225, determine the sorter current speed and set peripheral conveyor commanded speeds 222 for the peripheral conveyors 54 based at least in part on the sorter current speed (e.g., setting the peripheral conveyor commanded speeds 222 to match the sorter current speed or setting the peripheral conveyor commanded speeds 222 to a ratio or proportion of the sorter current speed), for example, during acceleration and/or deceleration of the sorter 52. The acceleration and deceleration of the sorter 52 may be initiated (e.g., by the sorter controller 225) in response to, respectively, start and stop events for the sorter 52.

The speed controller 202 may be configured to set the peripheral conveyor commanded speeds 222 for the peripheral conveyors 54 based on the exception settings 220 stored in the memory 210 of the speed controller 202. In various embodiments, the speed controller 202 may vary the behavior of certain types of peripheral conveyors 54 at certain times (e.g., during acceleration or deceleration of the sorter 52) based on the exception settings 220. For example, the exception settings 220 may cause the peripheral conveyors 54 (e.g., the upstream conveyors 54-$u$) to stop immediately during deceleration of the sorter 52 (rather than match the sorter current speed) in case of an emergency stop or other configurable events.

Figure 2B:
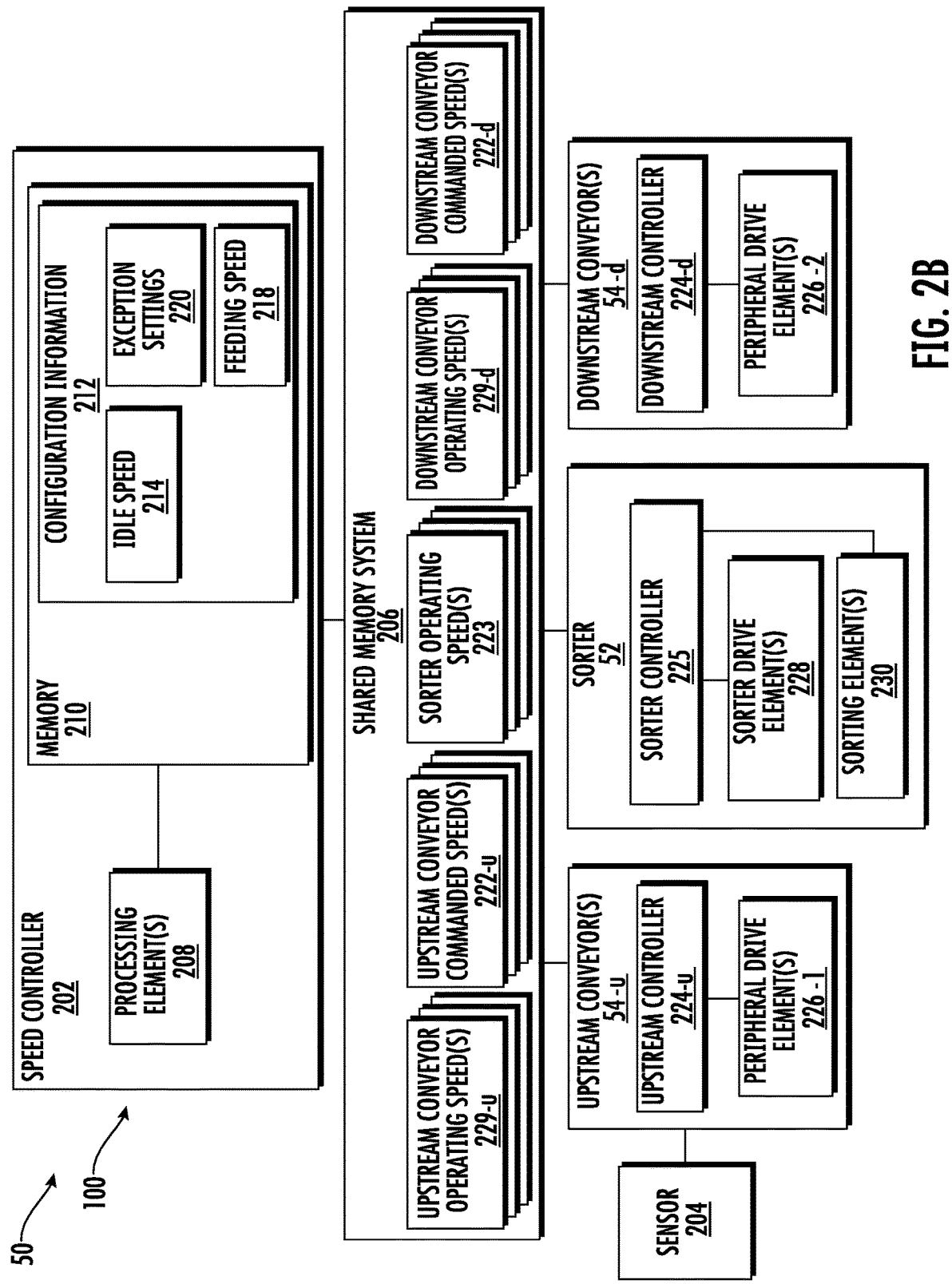
FIG. 2B is a schematic diagram of an exemplary speed control system according to various embodiments, according to a typical configuration of the sorter system with upstream conveyors and downstream conveyors.

FIG. 2B is a schematic diagram of an exemplary speed control system 100 according to various embodiments, showing a typical configuration of the sorter system 50 and speed control system 100.

In the illustrated example, the speed control system 100 sets the commanded speeds for a sorter system 50 that comprises specifically a sorter 52, one or more upstream conveyors 54-$u$, and one or more downstream conveyors 54-$d$.

In general, the various components of the sorter system 50 and the speed control system 100 may operate as previously described with respect to FIG. 2A.

Now, however, the speed control system 100 may control the speed of the different peripheral conveyors 54 in various ways based on whether the peripheral conveyors 54 are upstream conveyors 54-$u$ or downstream conveyors 54-$d$.

More particularly, the upstream controller 224-$u$ of the upstream conveyor 54-$u$ may direct the functionality of specifically the upstream conveyor 54-$u$ by controlling (e.g., sending instructions to and/or receiving information from) the peripheral drive element(s) 226-1 of the upstream conveyor 54-$u$ in the manner previously described with respect to FIG. 2A. Similarly, the downstream controller 224-$d$ of the downstream conveyor 54-$d$ may direct the functionality of specifically the downstream conveyor 54-$d$ by controlling (e.g., sending instructions to and/or receiving information from) the peripheral drive element(s) 226-2 of the downstream conveyor 54-$d$ in the manner previously described with respect to FIG. 2A.

An upstream conveyor commanded speed 222-$u$ may generally be a value corresponding to a commanded speed specifically for an upstream conveyor 54-$u$, and a downstream conveyor commanded speed 222-$d$ may generally be a value corresponding to the commanded speed specifically for a downstream conveyor 54-*d*. The speed controller 202 may be configured to set the commanded speeds 222-*u*, 222-*d* of the upstream conveyors 54-*u* and the downstream conveyors 54-*d* (e.g., based on the configuration information 212 stored in the memory 210). Moreover, the upstream conveyor commanded speeds 222-*u* and the downstream conveyor commanded speeds 222-*d* at a given instance of time may differ with respect to each other, as the behavior (e.g., speeds) of the different types of peripheral conveyors 54 are controlled differently by the speed controller 202 in certain situations based on the type of peripheral conveyor 54 (e.g., upstream, downstream).

The upstream controller 224-*u* may be configured to receive the upstream conveyor commanded speed 222-*u* (e.g., from the speed controller 202) and send instructions and/or signals to the peripheral drive elements 226-1 (e.g., motor) causing the upstream conveyor 54-*u* to operate at the upstream conveyor commanded speed 222-*u*. Similarly, the downstream controller 224-*d* may be configured to receive the downstream conveyor commanded speed 222-*d* (e.g., from the speed controller 202) and send instructions and/or signals to the peripheral drive elements 226-2 (e.g., motor) causing the downstream conveyor 54-*d* to operate at the downstream conveyor commanded speed 222-*d*.

The upstream conveyor commanded speed 222-*u* and the downstream conveyor commanded speed 222-*d* may be stored by the shared memory system 206. More particularly, the shared memory system 206 may be configured to store an upstream conveyor commanded speed 222-*u* associated with each upstream conveyor 54-*u* and a downstream conveyor commanded speed 222-*d* associated with each downstream conveyor 54-*d*. Accordingly, an upstream controller 224-*u* of an upstream conveyor 54-*u* may be configured to receive the upstream conveyor commanded speed 222-*u* by retrieving the upstream conveyor commanded speed 222-*u* associated with the upstream conveyor 54-*u* from the shared memory system 206, and a downstream controller 224-*d* of a downstream conveyor 54-*d* may be configured to receive the downstream conveyor commanded speed 222-*d* by retrieving the downstream conveyor commanded speed 222-*d* associated with the downstream conveyor 54-*d* from the shared memory system 206. The speed controller 202 may be configured to set and/or update the upstream conveyor commanded speed(s) 222-*u* and the downstream conveyor commanded speed(s) 222-*d* by storing and/or updating, respectively, the upstream conveyor commanded speed(s) 222-*u* and the downstream conveyor commanded speed(s) 222-*d* in the shared memory system 206.

Additionally, the speed controller 202 may be configured to set the upstream conveyor commanded speed(s) 222-*u* and the downstream conveyor commanded speed(s) 222-*d* based on the exception settings 220 stored in the memory 210 of the speed controller 202. In various embodiments, the speed controller 202 may vary the behavior of the different types of peripheral conveyors 54 at certain times (e.g., during acceleration or deceleration of the sorter 52) based on the exception settings 220. For example, the exception settings 220 may cause the peripheral conveyors 54 (e.g., the upstream conveyors 54-*u*) to stop immediately during deceleration of the sorter 52 (rather than match the sorter current speed) in case of an emergency stop or other configurable events.

Figure 3:
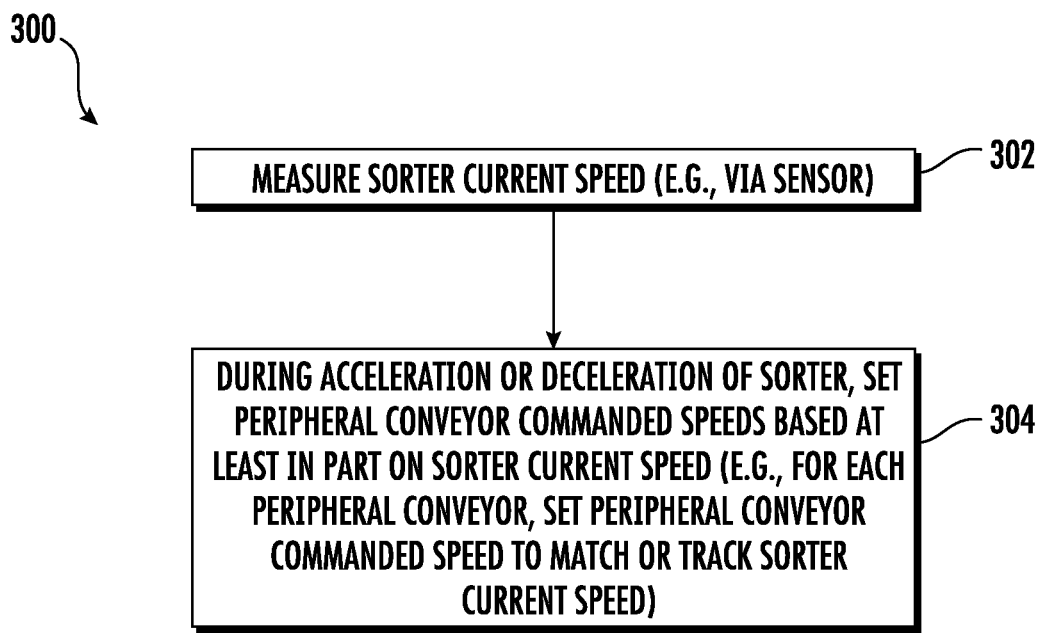
FIG. 3 is a flow diagram illustrating an exemplary process by which a speed controller of the speed control system controls speeds of the peripheral conveyors during acceleration or deceleration of the sorter.

FIG. 3 is a flow diagram illustrating an exemplary process 300 by which the speed controller 202 controls the speed of the peripheral conveyors 54 during acceleration or deceleration of the sorter 52. More detailed examples of the process 300 according to various embodiments are provided in FIGS. 4-9.

At step 302 of the process 300, the speed controller 202, via the sensor 204 and/or the sorter controller 225, determines the sorter current speed. Here, the sensor 204 may be connected to the sorter 52, and the sorter controller 225 may compute the sorter current speed (e.g., based on measurements from the sensors 204), and the speed controller 202 may receive the sorter current speed from the sorter controller 225 (e.g., via the shared memory system 206 or via other communication mechanisms).

At step 304 of the process 300, the speed controller 202 sets the peripheral conveyor commanded speeds 222 (e.g., stored in the shared memory system 206) such that the peripheral conveyor target speeds 222 are set based at least in part on the sorter current speed during acceleration or deceleration of the sorter 52. Here, the speed controller 202 may set the peripheral conveyor commanded speeds 222 based at least in part on the sorter current speed by, for each peripheral conveyor 54, setting the peripheral conveyor commanded speed 222 for the peripheral conveyor 54 to match the sorter current speed (e.g., setting the peripheral conveyor commanded speed 222 to a value equivalent to the sorter current speed) or to track the sorter current speed (e.g., setting the peripheral conveyor commanded speed 222 to a value proportionate to the sorter current speed or a ratio of the sorter current speed). For example, during acceleration or deceleration of the sorter 52, during which the sorter current speed continuously changes, the speed controller 202 may continually update (e.g., at periodic intervals) the peripheral conveyor commanded speeds 222 by setting the peripheral conveyor commanded speeds 222 to match or track the sorter current speed determined for a current instance of time (e.g., when each update is performed). In other words, the speed controller 222 may, at each instance of time of a plurality of instances of time for the duration of the acceleration or deceleration of the sorter 52, determine the sorter current speed at that instance of time and update the peripheral conveyor commanded speed 222 for each peripheral conveyor 54 based at least in part on the sorter current speed determined at that instance of time (e.g., by setting the peripheral conveyor commanded speed 222 for each peripheral conveyor 54 to match or track the sorter current speed determined at that instance of time). Here, at each instance of time of the plurality of instances of time, the speed controller 202 may determine (e.g., calculate) a ramping speed value for each peripheral conveyor 54 and assign the ramping speed value to the peripheral conveyor commanded speed, the ramping speed value representing a speed at which a given peripheral conveyor 54 should operate at a given instance of time during acceleration or deceleration of the sorter 52. The speed controller 202 may determine the ramping speed value by calculating a value equivalent to or proportionate to the sorter current speed at the current instance of time. Additionally, the speed controller 202 may set the peripheral conveyor commanded speeds 222 by storing and/or updating values for the commandedspeeds 222 in the shared memory system 206, as previously described with respect to FIGS. 2A and 2B.

Generally, the acceleration or deceleration of the sorter 52 referred to above (e.g., with respect to step 304) may be acceleration or deceleration from any initial speed to any subsequent speed. For example, the acceleration of the sorter 52 may be from a stopped state to a predetermined sorter operating speed 223, which may occur in response to a start event at the sorter 52 (e.g., an initial startup of the sorter 52).

The acceleration of the sorter 52 may also be from an initial lower sorter operating speed 223 (e.g., 300 fpm), which corresponds to a first normal operating condition of the sorter 52, to a subsequent higher sorter operating speed 223 (e.g., 600 fpm) corresponding to a second normal operating condition of the sorter 52, which may occur in response to a command at the sorter 52 to operate at the higher sorter operating speed 223. Similarly, the deceleration of the sorter 52 may be from a predetermined sorter operating speed 223 to a stopped state, which may occur in response to a stop event at the sorter 52 (e.g., a stop command received by the sorter 52). The deceleration of the sorter 52 may be from an initial higher sorter operating speed 223 (e.g., 600 fpm), which corresponds to a first normal operating condition of the sorter 52, to a subsequent lower sorter operating speed 223 (e.g., 300 fpm) corresponding to a second normal operating condition of the sorter 52, which may occur in response to a command at the sorter 52 to operate at the lower sorter operating speed 223. A normal operating condition of the sorter 52 may refer to a condition during which the sortation conveyor of the sorter 52 is not in a stopped state and/or during which articles are actively transported onto the sorter 52 and/or sorted by the sorter 52.

Figure 4:
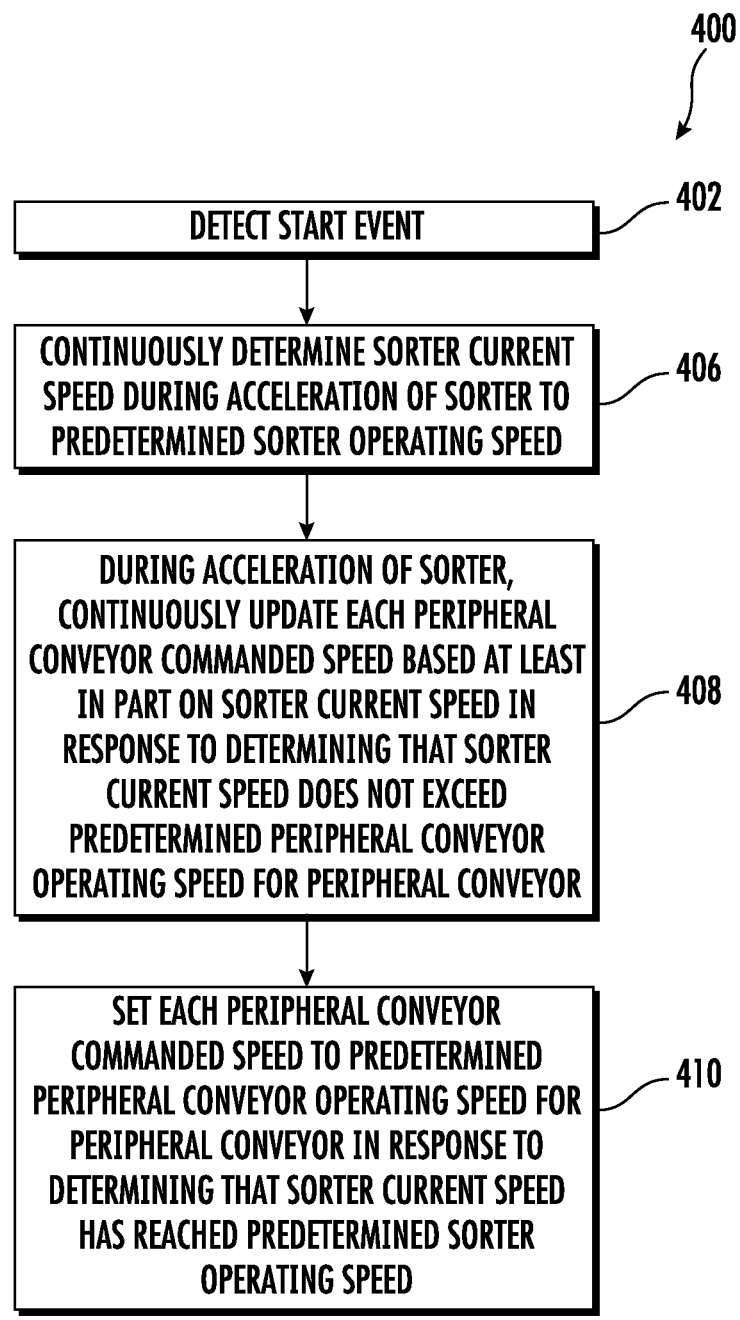
FIG. 4 is a flow diagram illustrating an exemplary process by which the speed controller sets peripheral conveyor commanded speeds of peripheral conveyors based on a sorter current speed, specifically during acceleration of a sorter.

FIG. 4 is a flow diagram illustrating an exemplary process 400 by which the speed controller 202 sets the peripheral conveyor commanded speeds 222 based at least in part on the sorter current speed (e.g., as at step 304 of the process 300 illustrated in FIG. 3), specifically during acceleration of the sorter 52 (e.g., from a stopped state to a sorter operating speed 223, in response to detection of start events at the sorter).

At step 402 of the process 400, the speed controller 202 detects a start event at the sorter 52. The start event may signify an initial start-up of the sorter system 50 and may originate from the sorter controller 225 of the sorter 52, for example. At an instance of time when the start event is detected, the sorter 52 may be in a stopped state. In response to the start event, the sorter 52 may begin accelerating from a stopped state (e.g., having a sorter current speed of 0) to the predetermined sorter operating speed 223.

At step 406 of the process 400, the speed controller 202 continuously determines (e.g., via the sensor 204 and/or the sorter controller 225) the sorter current speed (e.g., as at step 302 of the process 300 illustrated in FIG. 3) during acceleration of the sorter 52 from the stopped state to the predetermined sorter operating speed 223.

At step 408 of the process 400, during the acceleration of the sorter 52, the speed controller 202 continuously sets and/or updates each peripheral conveyor commanded speed 222 based at least in part on the sorter current speed (e.g., to match or track the sorter current speed) in response to determining that the sorter current speed (e.g., at a given instance of measuring the sorter current speed during the continuous measurement of the sorter current speed) does not exceed the predetermined peripheral conveyor operating speed 222 for the peripheral conveyor 54. In this way, the speed controller 202 causes the speed of the peripheral conveyors to ramp up at a similar acceleration rate as that of the sorter 52.

At step 410 of the process 400, in response to determining that the sorter current speed has reached the predetermined sorter operating speed 223, the speed controller 202 sets each peripheral conveyor commanded speed 222 to the predetermined peripheral conveyor operating speed 229 for the peripheral conveyor 54.

Figure 5:
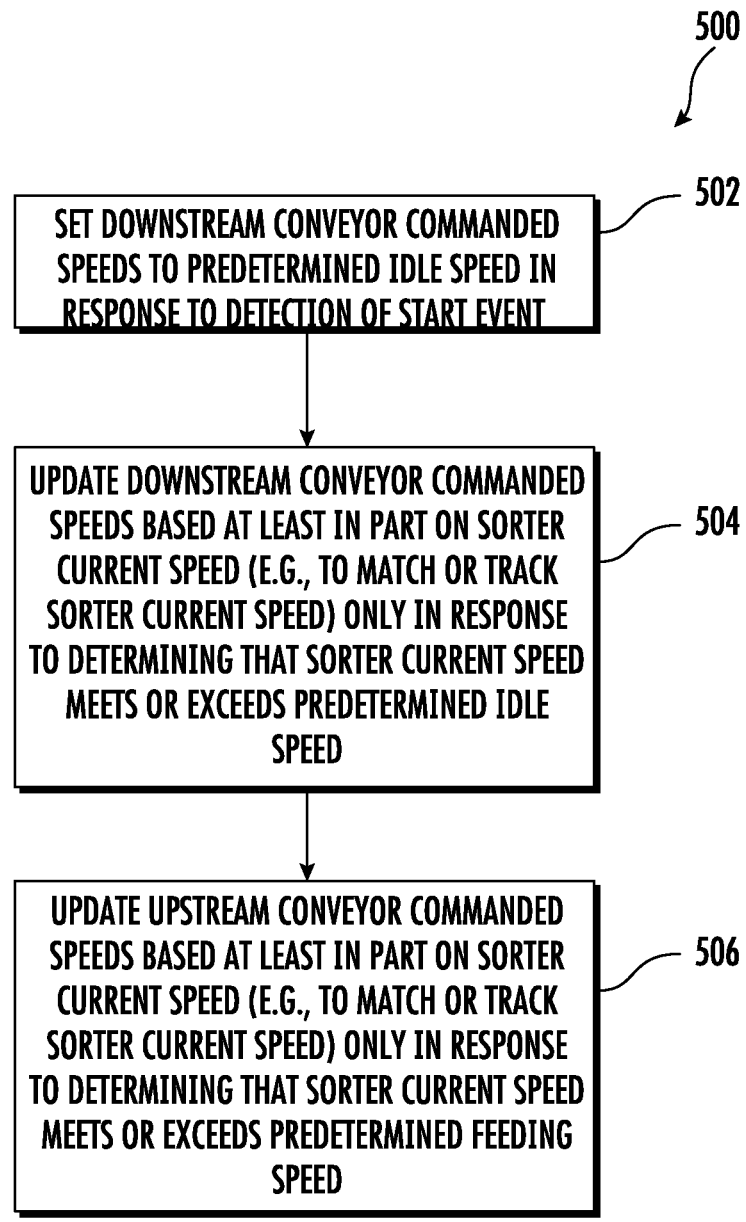
FIG. 5 is a flow diagram illustrating an exemplary process by which the speed controller sets the peripheral conveyor commanded speeds differently with respect to specifically upstream conveyors and downstream conveyors of the peripheral conveyors.

FIG. 5 is a flow diagram illustrating an exemplary process 500 by which the speed controller 202 (e.g., as at step 304 of the process 300 illustrated in FIG. 3 and/or step 408 of the process 400 illustrated in FIG. 4) sets the peripheral conveyor commanded speeds 222 differently with respect to specifically upstream conveyors 54-*u* and downstream conveyors 54-*d*.

At step 502 of the process 500, the speed controller 202 sets the downstream conveyor commanded speeds 222-*d* to the predetermined idle speed 214 in response to the detection of the start event.

At step 504 of the process 500, the speed controller 202 sets and/or updates the downstream conveyor commanded speeds 222-*d* based at least in part on the sorter current speed (e.g., as at step 304 of the process 300 illustrated in FIG. 3 and/or step 408 of the process 400 illustrated in FIG. 4) only in response to determining that the sorter current speed meets or exceeds the idle speed 214. In one example, the speed controller 202 may be configured to set the downstream conveyor commanded speeds 222-*d* to match or track the sorter current speed as soon as the current sorter speed passes the idle speed 214.

At step 506 of the process 500, the speed controller 202 sets and/or updates the upstream conveyor commanded speeds 222-*u* based at least in part on the sorter current speed (e.g., as at step 304 of the process 300 illustrated in FIG. 3 and/or step 408 of the process 400 illustrated in FIG. 4) only in response to determining that the sorter current speed meets or exceeds the predetermined feeding speed 218. In this way, the speed controller 202 may be configured to ensure that the upstream conveyors 54-*u* do not start operating until the sorter 52 has reached a speed at which the sorter 52 is ready to receive articles from the upstream conveyors 54-*u* (in addition to causing the speed of the upstream conveyors 54-*u* to ramp up at the same acceleration rate as that of the sorter 52).

Figure 6:
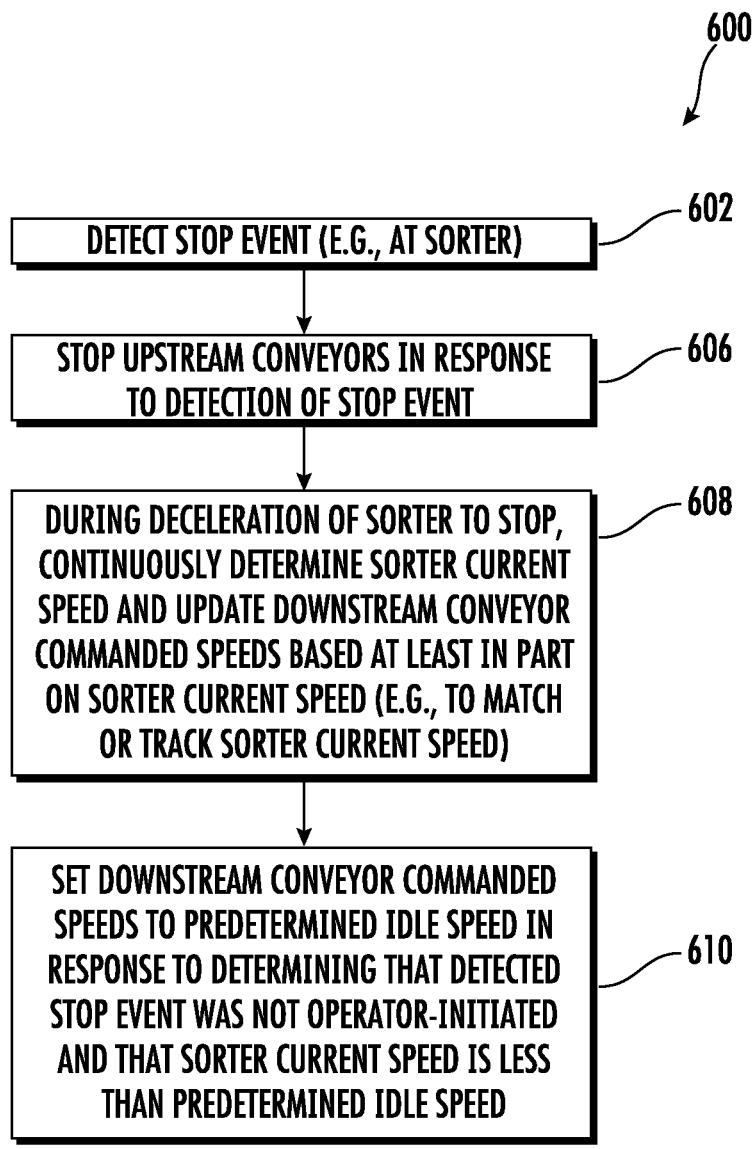
FIG. 6 is a flow diagram illustrating an exemplary process by which the speed controller sets the peripheral conveyor commanded speeds based on the sorter current speed, specifically during deceleration of the sorter.

FIG. 6 is a flow diagram illustrating an exemplary process 600 by which the speed controller 202 sets the peripheral conveyor commanded speeds 222 based at least in part on the sorter current speed (e.g., as at step 304 of the process 300 illustrated in FIG. 3), specifically during deceleration of the sorter 52 in response to stop events at the sorter 52. Additionally, the illustrated process 600 provides an example of how the speed controller 202 sets the peripheral conveyor commanded speeds 222 differently with respect to specifically upstream conveyors 54-*u* and downstream conveyors 54-*d* during the deceleration of the sorter 52.

At step 602 of the process 600, the speed controller 202 detects a stop event at the sorter 52. The stop event may signify a pause or shut-down of the sorter system 50 and may originate from the sorter controller 225 of the sorter 52, for example. At an instance of time when the stop event is detected, the sorter 52 and/or the peripheral conveyors 54 may be operating at a predetermined sorter operating speed 223 corresponding to a normal operating condition of the sorter 52. In response to the stop event, the sorter 52 may begin decelerating from an initial speed (e.g., the predetermined sorter operating speed 223) to a stop, at which point the sorter 52 may assume a stopped state.

At step 606 of the process 600, the speed controller 202 stops the upstream conveyors 54-*u* in response to detecting the stop event at the sorter. The speed controller 202 may be configured to stop the upstream conveyors 54-*u* (e.g., by sending stop/deactivation instructions and/or signals, by setting the upstream conveyor commanded speed 222-*u* to a predetermined stopped speed, which may represent a value of 0). In response to the speed controller 202 stopping the upstream conveyors 54-*u*, the stopped upstream conveyors 54-*u* may decelerate from an initial speed (e.g., a predetermined peripheral conveyor operating speed 229) to a stop, at which point the upstream conveyors 54-*u* may assume a stopped state.

At step 608 of the process 600, during the deceleration of the sorter 52 from the initial speed (e.g., predetermined sorter operating speed 223) to a stop, the speed controller 202 continuously determines (e.g., via the sensor 204 and/or the sorter controller 225) the sorter current speed (e.g., as at step 302 of the process 300 illustrated in FIG. 3). Additionally, at step 608, during the deceleration of the sorter 52, the speed controller 202 continuously sets and/or updates (e.g., as at step 408 of the process 400 illustrated in FIG. 4) the downstream peripheral commanded speeds 222-*d* based at least in part on the sorter current speed (e.g., to match or track the sorter current speed).

In this way, in response to the detection of a stop event, the speed controller 202 may be configured to stop upstream conveyors 54-*u* immediately (e.g., without ramping down with the sorter 52) while causing the downstream conveyors 54-*d* to ramp down at a similar acceleration rate as that of the sorter 52.

At step 610 of the process 600, the speed controller 202 sets the downstream conveyor commanded speeds 222-*d* to the predetermined idle speed 214 in response to determining that the detected stop event was not operator-initiated and that the sorter current speed is less than the idle speed 214. Thus, once the sorter 52 has reached a stop, the speed controller 202 may be configured to simply set the downstream conveyors 54-*d* to operate at the idle speed 214 instead of fully stopping them, while fully stopping the upstream conveyors 54-*u*.

Figure 7:
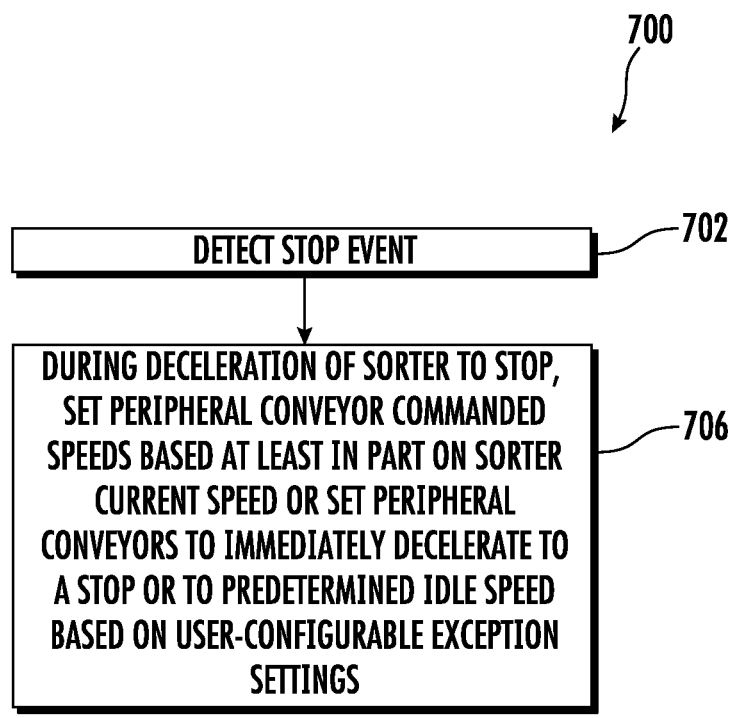
FIG. 7 is a flow diagram illustrating an exemplary process by which the speed controller sets the peripheral conveyor commanded speeds during deceleration of the sorter, specifically based on user-configurable exception settings.

FIG. 7 is a flow diagram illustrating an exemplary process 700 by which the speed controller 202 sets the peripheral conveyor commanded speeds 222 during deceleration of the sorter 52 (e.g., as in the process 600 illustrated in FIG. 6), specifically based on user-configurable exception settings 220. Additionally, the illustrated process 700 provides another example of how the speed controller 202 sets the peripheral conveyor target speeds 222 differently with respect to specifically upstream conveyors 54-*u* and downstream conveyors 54-*d* during the deceleration of the sorter 52.

At step 702 of the process 700, the speed controller 202 detects a stop event at the sorter 52 (e.g., in a manner similar to that described with respect to step 602 of the process 600 illustrated in FIG. 6). In response to the stop event, the sorter 52 may decelerate to a stopped state (e.g., in a manner similar to that described with respect to step 602 of the process 600 illustrated in FIG. 6).

At step 706, during the deceleration of the sorter 52 from the initial speed (e.g., predetermined sorter operating speed 223) to a stop, the speed controller 202 either sets peripheral conveyor commanded speeds 222 of the peripheral conveyors 54 based at least in part on the sorter current speed (e.g., to match or track the sorter current speed) or sets the peripheral conveyors 54 to immediately decelerate to either a stop or to the predetermined idle speed 214 based on the user-configurable exception settings 220 (e.g., stored as part of the configuration information 212 in the memory 210 of the speed controller 202). Here, the exception settings 220 may indicate which types of peripheral conveyors 54 (e.g., upstream, downstream, intermediate) should perform which actions (e.g., ramp down deceleration with the sorter 52 or decelerate immediately, decelerate to a full stop or to the idle speed 214) in response to certain types of stop events (e.g., operator stop, emergency stop, fault).

Figure 8:
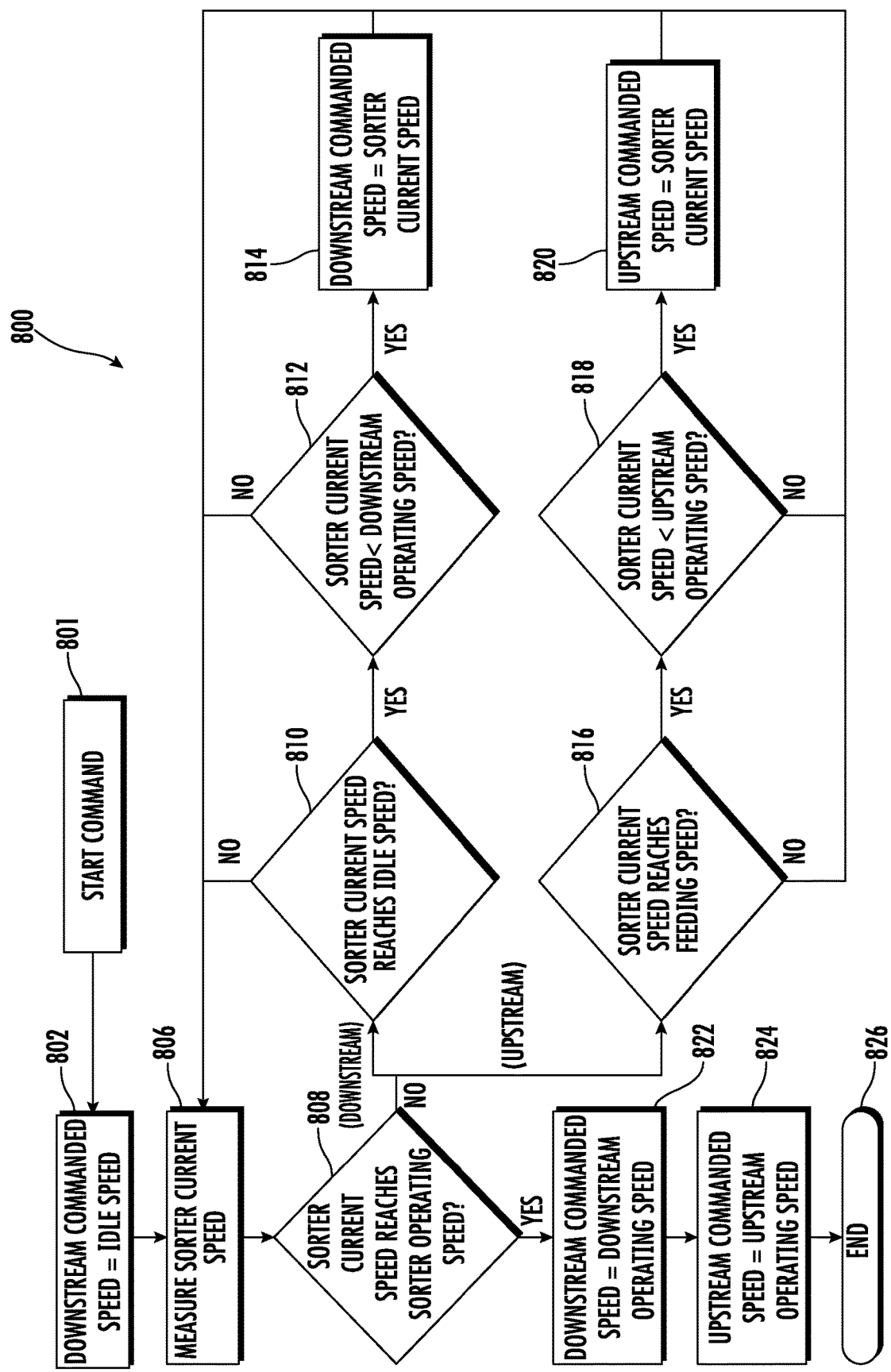
FIG. 8 is a flow diagram illustrating an exemplary process by which the speed controller sets the peripheral conveyor commanded speeds during acceleration of the sorter, combining aspects of the processes illustrated in FIGS. 3, 4, and 5.

FIG. 8 is a flow diagram illustrating an exemplary process 800 by which the speed controller 202 sets the peripheral conveyor operating speeds 222 during acceleration of the sorter 52, combining aspects of the process 300 illustrated in FIG. 3, the process 400 illustrated in FIG. 4, and the process 500 illustrated in FIG. 5.

At step 801 of the process 800, a start event is detected by the speed controller 202 at the sorter 52 in a manner similar to that described with respect to step 402 of the process 400.

At step 802 of the process 800, the speed controller 202 sets the downstream conveyor commanded speeds 222-*d* to the predetermined idle speed 214 in a manner similar to that described with respect to step 502 of the process 500.

At step 806 of the process 800, the speed controller 202 determines the sorter current speed (e.g., via the sensor 204 and/or the sorter controller 225).

At step 808 of the process 800, the speed controller 202 determines whether the sorter current speed has reached the predetermined sorter operating speed 223.

If the sorter current speed has not yet reached the predetermined sorter operating speed 223, the speed controller 202 proceeds to set the commanded speeds for the upstream conveyors 54-*u* and the downstream conveyors 54-*d* in particular ways based on the type of peripheral conveyor.

For example, with respect to the downstream conveyors 54-*d*, in response to determining (e.g., at step 808) that the sorter current speed has not yet reached the predetermined sorter operating speed 223, the speed controller 202 at step 810 of the process 800 determines whether the sorter current speed has reached the idle speed 214. If the sorter current speed has not yet reached the idle speed 214, the speed controller 202 returns to steps 806 and 808, once again measuring the sorter current speed and evaluating it against the predetermined sorter operating speed 223. On the other hand, if the sorter current speed is determined to have reached the idle speed 214 at step 810, the speed controller 202 proceeds to step 812 of the process 800, in which the speed controller 202 determines whether the sorter current speed is less than the downstream operating speed 229-*d*. If the sorter current speed is not less than the downstream operating speed 229-*d*, the speed controller 202 returns to step 806 as before. However, if the sorter current speed is less than the downstream operating speed 229-*d*, the downstream conveyor commanded speed 222-*d* is set to the sorter current speed (e.g., causing the speed of the downstream conveyor 54-*d* to match the sorter current speed), at which point the speed controller 202 returns to step 806 as before. In another example (not illustrated), the downstream conveyor commanded speed 222-*d* may be set to a value proportionate to the sorter current speed or a ratio of the sorter current speed (e.g., causing the speed of the downstream conveyor 54-*d* to track the sorter current speed).

On the other hand, with respect to the upstream conveyors 54-*u*, in response to determining (e.g., at step 808) that that sorter current speed has not yet reached the predetermined sorter operating speed 223, the speed controller 202 at step 816 of the process 800 determines whether the sorter current speed has reached the feeding speed 218. If the sorter current speed has not yet reached the feeding speed 218, the speed controller 202 returns to steps 806 and 808, once again measuring the sorter current speed and evaluating the sorter current speed against the predetermined sorter operating speed 223. On the other hand, if the sorter current speed is determined to have reached the feeding speed at step 816, the speed controller 202 proceeds to step 818 of the process 800, in which the speed controller 202 determines whether the sorter current speed is less than the upstream operating speed 229-*u*. If the sorter current speed is not less than the upstream operating speed 229-*u*, the speed controller 202 returns to step 806 as before. However, if the sorter current speed is less than the upstream operating speed 229-*u*, the upstream commanded speed 222-*u* is set to the sorter current speed (e.g., causing the speed of the upstream conveyor 54-*u* to match the sorter current speed), at which point the speed controller 202 returns to step 806 as before. In another example (not illustrated), the upstream conveyor commanded speed 222-*u* may be set to a value proportionate to the sorter current speed or a ratio of the sorter current speed (e.g., causing the speed of the upstream conveyor 54-*u* to track the sorter current speed).

Thus, the speed controller 202 continuously sets and/or updates the peripheral conveyor commanded speeds 222 based at least in part on the sorter current speed (e.g., to match or track the sorter current speed) in response to determining that the sorter current speed (e.g., at a given instance of measuring the sorter current speed during the continuous measurement of the sorter current speed) does not exceed the peripheral conveyor operating speeds 229 (e.g., as at step 408 of the process 400 illustrated in FIG. 4). At the same time, the speed controller 202 sets the downstream conveyor commanded speeds 222-*d* based at least in part on the sorter current speed (e.g., to match or track the sorter current speed) only in response to determining that the sorter current speed meets or exceeds the idle speed 214 (e.g., as at step 504 of the process 500 illustrated in FIG. 5), and the speed controller 202 sets the upstream conveyor commanded speeds 222-*u* to match the sorter current speed only in response to determining that the sorter current speed meets or exceeds the feeding speed 218 (e.g., as at step 506 of the process 500 illustrated in FIG. 5).

Once it is determined, at step 808, that the sorter current speed has reached the predetermined sorter operating speed 223, the speed controller 202 proceeds to set the peripheral conveyor commanded speeds 222 to the respective peripheral conveyor operating speeds 229 by proceeding to steps 822 and 824. More particularly, at step 822 of the process 800, the speed controller 202 sets the downstream conveyor commanded speed 222-*d* for each downstream conveyor 54-*d* to the predetermined downstream conveyor operating speed 229-*d* for the downstream conveyor 54-*d*. Similarly, at step 824, the speed controller 202 sets the upstream conveyor commanded speed 222-*u* for each upstream conveyor 54-*u* to the predetermined upstream conveyor operating speed 229-*u* for the upstream conveyor 54-*u*. In this way, the speed controller 202 sets the peripheral conveyor commanded speeds 222 to the respective peripheral conveyor operating speeds 229 in response to determining that the sorter current speed has reached the predetermined sorter operating speed 223 (e.g., as at step 410 of the process 400 illustrated in FIG. 4).

The process 800 ends at step 826.

Figure 9:
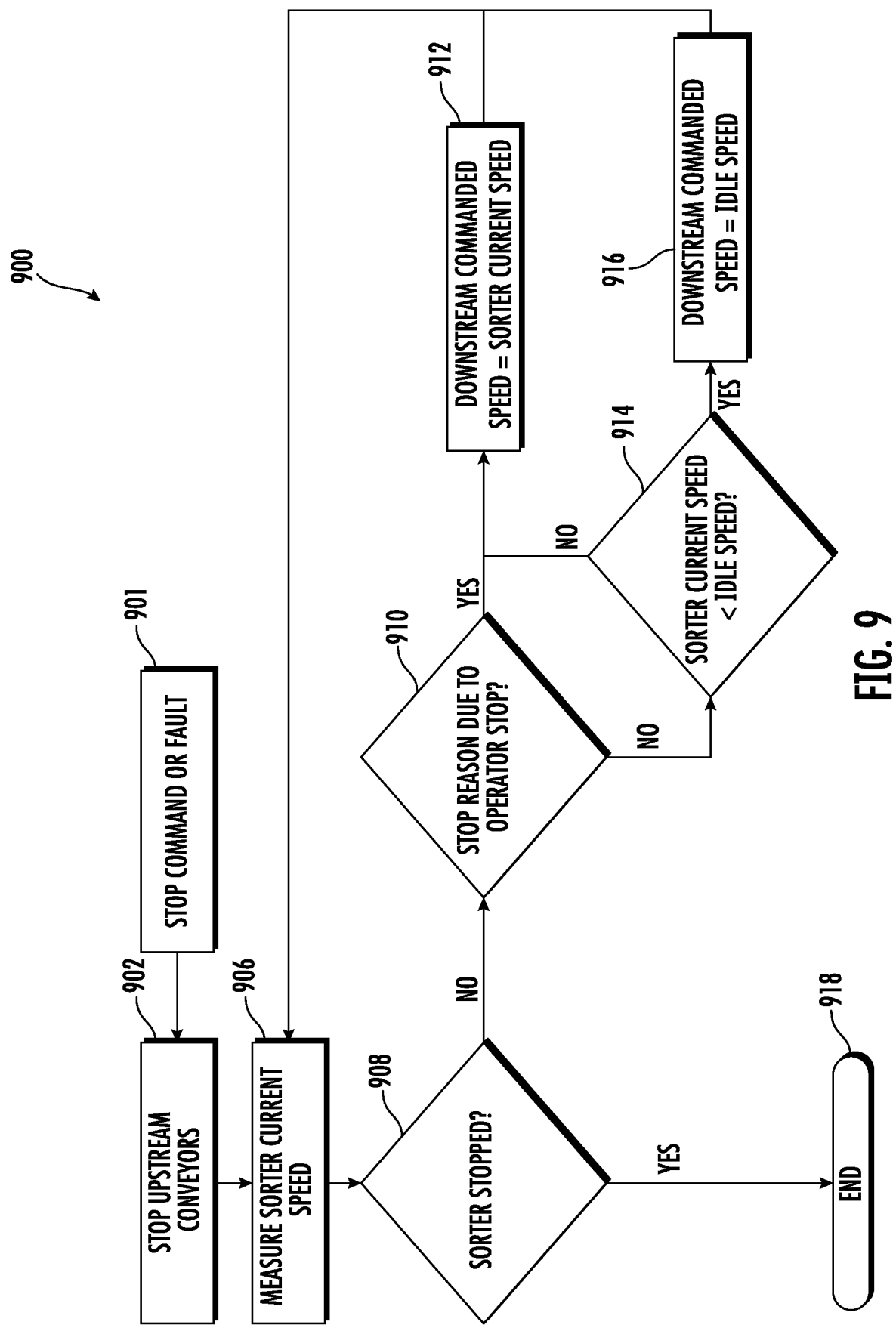
FIG. 9 is a flow diagram illustrating an exemplary process by which the speed controller sets the peripheral conveyor commanded speeds during deceleration of the sorter, combining aspects of the processes illustrated in FIGS. 3, 6, and 7.

FIG. 9 is a flow diagram illustrating an exemplary process 900 by which the speed controller 202 sets the peripheral conveyor commanded speeds 222 during deceleration of the sorter 52, combining aspects of the process 300 illustrated in FIG. 3, the process 600 illustrated in FIG. 6, and the process 700 illustrated in FIG. 7.

At step 901 of the process 900, a stop command or a fault (e.g., representing a stop event) detected by the speed controller 202 at the sorter 52 in a manner similar to that described with respect to step 602 of the process 600.

At step 902 of the process 900, the speed controller 202 stops the upstream conveyors 54-*u* in a manner similar to that described with respect to step 606 of the process 600.

At step 906 of the process 900, the speed controller 202 determines the sorter current speed (e.g., via the sensor 204 and/or the sorter controller 225).

At step 908 of the process 900, the speed controller 202 determines whether the sorter 52 has reached a stop (e.g., whether the sorter is in a stopped state and/or the sorter current speed is 0).

If the sorter has not yet reached a stop, the speed controller 202 proceeds to step 910 of the process 900, in which the speed controller 202 determines whether the stop event was due to an operator stop (e.g., in response to an operator of the sorter system 50 inputting a stop command via a user interface and/or pressing an emergency stop button or other fault condition).

If it is determined that the stop event was due to an operator stop, the speed controller proceeds to step 912 of the process 900, in which the speed controller 202 sets the downstream conveyor commanded speed 222-*d* to the sorter current speed and returns to steps 906 and 908, once again measuring the sorter current speed and determining if the sorter 52 has stopped.

On the other hand, if it is determined that the stop event was not due to an operator stop, the speed controller 202 proceeds to step 914 of the process 900, in which the speed controller 202 determines whether the sorter current speed is less than the predetermined idle speed 214. If not, the speed controller 202 proceeds to step 912 to set the downstream conveyor commanded speed 222-*d* to the sorter current speed. However, if it is determined that the sorter current speed is less than the idle speed 214, the speed controller 202 proceeds to step 916, in which the speed controller sets the downstream conveyor commanded speed to the idle speed 214 and returns to steps 906 and 908 as before. In another example (not illustrated), in step 912, the speed controller 202 may instead set the downstream conveyor commanded speed 222-*d* to a value proportionate to the sorter current speed or a ratio of the sorter current speed (e.g., causing the speed of the upstream conveyor 54-*u* to track the sorter current speed).

Once it is determined that the sorter has stopped at step 908, the process 900 ends at step 918.

In this way, the speed controller 202 may be configured to immediately stop upstream conveyors 54-*u* while ramping down the speed of the downstream conveyors 54-*d* to match or track the sorter current speed. Furthermore, the speed controller 202 may be configured to completely stop the downstream conveyors 54-*d* in the case of an operator stop but otherwise ramp down the speed of the downstream conveyors 54-*d* to the idle speed 214 rather than to a complete stop. This different behavior of the upstream conveyors 54-*u* versus the downstream conveyors 54-*d* may be caused by the speed controller 202 based on the user-configurable exception settings 220.

FIG. 10 is a table illustrating exemplary exception settings 220 for determining the different behavior of the different types of peripheral conveyors 54 in response to certain situations.

The table has a conveyor group column representing the type of peripheral conveyor 54, including upstream conveyors 54-*u*, intermediate conveyors 54, and downstream conveyors 54-*d*.

An exception types column provides, for each type of peripheral conveyor 54 indicated in the conveyor group column, a set of exception types corresponding to different stop events that might be triggered by the sorter system 50 and/or detected by the speed controller 202. The exception types provided in the illustrated example include a "recirc full" exception representing a situation in which one or more recirculation conveyors of the downstream conveyors 54-*d* are full (e.g., of articles) and thus unable to accept more articles from the sorter 52, an "exit jam" exception representing a situation in which articles can not be transported out of the sorter 52 and onto the downstream conveyors 54-*d* due to a jam, a "safety fault" exception representing a situation in which the sorter system 50 has triggered a fault indicating unsafe conditions (e.g., based on a current state of the sorter system 50), an "e-stop" exception representing a situation in which an emergency stop is triggered for the sorter system 50 (e.g., by the sorter controller 225, in response to user input such as pressing an emergency stop button), and an "entrance jam" exception representing a situation in which articles can not be transported into the sorter 52 by the upstream conveyors 54-*u* due to a jam. In general, any subset of the possible exception types, or none of the exception types, may be supported for each type of peripheral conveyor 54.

A default actions column indicates, for each exception type indicated for each type of peripheral conveyor 54 an action or sequence of actions to be performed by the peripheral conveyors 54 in the event that an exception of that type is detected.

On the other hand, an allowed override actions column indicates, for each type of peripheral conveyor 54 indicated in the conveyor group column, which action or sequence of actions are allowed (e.g., by the speed controller 202 via the exception settings 220) to be performed in lieu of any of the default actions indicated in the default actions column.

The actions indicated in the default actions column and the allowed override actions column include "ramp to stop" representing a sequence of actions in which a peripheral conveyor commanded speed 222 for a peripheral conveyor 54 is continuously set to match the current sorter speed during deceleration of the sorter 52, ultimately concluding at a full stop, "ramp to idle" representing a sequence of actions in which a peripheral conveyor commanded speed 222 for a peripheral conveyor 54 is continuously set to match the current sorter speed during deceleration of the sorter 52, ultimately concluding with the peripheral conveyor 54 operating at the idle speed 214, "stop" representing a sequence of actions in which a peripheral conveyor 54 is immediately stopped and not ramped down with the sorter 52, and "idle" representing a sequence of actions in which a peripheral conveyor target speed 222 for a peripheral conveyor 54 is immediately set to the idle speed 214 without ramping down with the sorter 52.

In various embodiments, the supported exception types for each type of conveyor 54, the default actions for each exception type for each type of conveyor 54, and the override actions allowed for each type of conveyor 54 may be configured by the user and indicated in the exception settings 220.

In the illustrated example, the upstream conveyors 54-*u* do not support any exception types and/or any override actions to be configured in the exception settings 220.

In the illustrated example, the intermediate conveyors of the peripheral conveyors 54 support the "recirc full," "exit jam," "safety fault," "e-stop," and "entrance jam" exceptions, and each of the "recirc full," "exit jam," and "safety fault" exception types have a default action of "ramp to stop," while the "e-stop" and "entrance jam" exception types have a default action of "stop." Thus, by default, the speed controller 202 will cause the intermediate conveyors to ramp down at a speed that matches or tracks the current sorter speed during deceleration of the sorter 52 and ultimately stop in response to detecting either the "recirc full," "exit jam," and/or "safety fault" states of the sorter system 50 and will immediately stop the intermediate conveyors in response to detecting the "e-stop" or "entrance jam" states of the sorter system 50. However, any of these default actions can be overridden (e.g., by a user via user input detected by a user interface of the sorter system 50 and/or the speed controller 202) and set to the "stop" or "ramp to stop" actions.

Moreover, in the illustrated example, the downstream conveyors 54-*d* support the "recirc full," "exit jam," "safety fault," "e-stop," and "entrance jam" exceptions, and the "recirc full" exception type has a default action of "ramp to stop," each of the "exit jam," "safety fault," and "entrance jam" exception types have a default action of "ramp to idle," while the "e-stop" exception type has a default action of "stop." Thus, by default, the speed controller 202 will cause the downstream conveyors 54-*d* to ramp down at a speed that matches or tracks the current sorter speed during deceleration of the sorter 52 and ultimately stop (in response to detecting the "exit jam," state) or ultimately decelerate to the idle speed 214 (in response to detecting the "exit jam," and/or "safety fault," or "entrance jam" states) and will immediately stop the downstream conveyors 54-*d* in response to detecting the "e-stop" state of the sorter system 50. However, any of these default actions can be overridden (e.g., by a user via user input detected by a user interface of the sorter system 50 and/or the speed controller 202) and set to the "stop," "idle," "ramp to stop," or "ramp to idle" actions.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A speed control system for sorters comprising:
   a sensor for measuring a sorter current speed for a sorter; and
   a speed controller for setting peripheral conveyor commanded speeds for peripheral conveyors, wherein the peripheral conveyors are in communication with the sorter, and the peripheral conveyor commanded speeds are set such that a peripheral conveyor commanded speed is set based at least in part on the sorter current speed during acceleration or deceleration of the sorter.

2. The speed control system of claim 1, wherein the speed controller sets the peripheral conveyor commanded speed based at least in part on the sorter current speed by setting the peripheral conveyor commanded speed to match the sorter current speed or track the sorter current speed during acceleration or deceleration of the sorter.

3. The speed control system of claim 1, wherein the acceleration or deceleration of the sorter is from an initial sorter operating speed corresponding to a first normal operating condition of the sorter to a subsequent sorter operating speed corresponding to a second normal operating condition of the sorter.

4. The speed control system of claim 1, wherein the speed controller, in response to detecting start events at the sorter, continuously determines the sorter current speed during acceleration of the sorter to a predetermined sorter operating speed, and sets each peripheral conveyor commanded speed to a predetermined peripheral conveyor operating speed for the peripheral conveyor in response to determining that the sorter current speed has reached the predetermined sorter operating speed.

5. The speed control system of claim 4, wherein the speed controller, during the acceleration of the sorter, continuously updates each peripheral conveyor commanded speed based at least in part on the sorter current speed in response to determining that the sorter current speed does not exceed the predetermined peripheral conveyor operating speed for the peripheral conveyor.

6. The speed control system of claim 5, wherein the speed controller sets downstream conveyor commanded speeds for downstream conveyors of the peripheral conveyors to a predetermined idle speed in response to the detection of the start events and updates the downstream conveyor commanded speeds based at least in part on the sorter current speed only in response to determining that the sorter current speed meets or exceeds the predetermined idle speed.

7. The speed control system of claim 5, wherein the speed controller updates upstream conveyor commanded speeds for upstream conveyors of the peripheral conveyors based at least in part on the sorter current speed only in response to determining that the sorter current speed meets or exceeds a predetermined feeding speed.

8. The speed control system of claim 1, wherein the speed controller, in response to detecting stop events at the sorter, stops upstream conveyors of the peripheral conveyors and, during deceleration of the sorter to a stopped state, continuously determines the sorter current speed and updates downstream conveyor commanded speeds for downstream conveyors of the peripheral conveyors based at least in part on the sorter current speed.

9. The speed control system of claim 8, wherein the speed controller sets the downstream conveyor commanded speeds to a predetermined idle speed in response to determining that the detected stop event was not operator-initiated and that the sorter current speed is less than the predetermined idle speed.

10. The speed control system of claim 1, wherein the speed controller, during deceleration of the sorter to a stopped state in response to detecting stop events at the sorter, sets the peripheral conveyor commanded speeds based at least in part on the sorter current speed or sets the peripheral conveyor to immediately decelerate to a stopped state or to a predetermined idle speed based on user-configurable exception settings stored by the speed controller.

11. A speed control method for sorters comprising:
measuring a current speed of a sorter;
setting peripheral conveyor commanded speeds for peripheral conveyors, wherein the peripheral conveyors are in communication with the sorter, and the peripheral conveyor commanded speeds are set such that a peripheral conveyor commanded speed is set based at least in part on the sorter current speed during acceleration or deceleration of the sorter.

12. The speed control method of claim 11, wherein setting the peripheral conveyor commanded speed based at least in part on the sorter current speed comprises setting the peripheral conveyor commanded speed to match the sorter current speed or track the sorter current speed during acceleration or deceleration of the sorter.

13. The speed control method of claim 11, wherein the acceleration or deceleration of the sorter is from an initial sorter operating speed corresponding to a first normal operating condition of the sorter to a subsequent sorter operating speed corresponding to a second normal operating condition of the sorter.

14. The speed control method of claim 11, further comprising, in response to detecting start events at the sorter, continuously determining the sorter current speed during acceleration of the sorter to a predetermined sorter operating speed, and setting each peripheral conveyor target speed to a predetermined peripheral conveyor operating speed in response to determining that the sorter current speed has reached the predetermined sorter operating speed.

15. The speed control method of claim 14, further comprising, during the acceleration of the sorter, continuously updating each peripheral conveyor commanded speed based at least in part on the sorter current speed in response to determining that the sorter current speed does not exceed the predetermined peripheral conveyor operating speed for the peripheral conveyor.

16. The speed control method of claim 15, further comprising setting downstream conveyor commanded speeds for downstream conveyors of the peripheral conveyors to a predetermined idle speed in response to the detection of the start events and updating the downstream conveyor commanded speeds based at least in part on the sorter current speed only in response to determining that the sorter current speed meets or exceeds the predetermined idle speed.

17. The speed control method of claim 15, further comprising updating upstream conveyor commanded speeds for upstream conveyors of the peripheral conveyors based at least in part on the sorter current speed only in response to determining that the sorter current speed meets or exceeds a predetermined feeding speed.

18. The speed control method of claim 11, further comprising, in response to detecting stop events at the sorter, stopping upstream conveyors of the peripheral conveyors and, during deceleration of the sorter to a stopped state, continuously determining the sorter current speed and updating downstream conveyor commanded speeds for downstream conveyors of the peripheral conveyors based at least in part on the sorter current speed.

19. The speed control method of claim 18, further comprising setting the downstream conveyor commanded speeds to a predetermined idle speed in response to determining that the detected stop event was not operator-initiated and that the sorter current speed is less than the predetermined idle speed.

20. The speed control method of claim 11, further comprising, during deceleration of the sorter to a stopped state in response to detecting stop events at the sorter, setting the peripheral conveyor commanded speeds based at least in part on the sorter current speed or setting the peripheral conveyor to immediately decelerate to a stopped state or to a predetermined idle speed based on user-configurable exception settings.

21. A sorter system comprising:
a sensor for measuring a sorter current speed for a sorter of the sorter system; and
a speed controller for setting peripheral conveyor commanded speeds for peripheral conveyors of the sorter system, wherein the peripheral conveyors are in communication with the sorter, and the peripheral conveyor commanded speeds are set such that a peripheral conveyor commanded speed is set based at least in part on the sorter current speed during acceleration or deceleration of the sorter.

* * * * *